(12) United States Patent
Schclar et al.

(10) Patent No.: US 7,961,957 B2
(45) Date of Patent: Jun. 14, 2011

(54) DIFFUSION BASES METHODS FOR SEGMENTATION AND CLUSTERING

(76) Inventors: Alon Schclar, Holon (IL); Amir Zeev Averbuch, Tel Aviv (IL)

( * ) Notice: Subject to any disclaimer, the term of this patent is extended or adjusted under 35 U.S.C. 154(b) by 1163 days.

(21) Appl. No.: 11/699,359

(22) Filed: Jan. 30, 2007

(65) Prior Publication Data

US 2008/0181503 A1 Jul. 31, 2008

(51) Int. Cl.
- G06K 9/00 (2006.01)
- G06K 9/34 (2006.01)
- G06K 9/40 (2006.01)
- G06K 9/36 (2006.01)
- G06K 9/62 (2006.01)
- G01N 33/48 (2006.01)

(52) U.S. Cl. ........ 382/225; 382/274; 382/166; 382/180; 382/284; 702/19

(58) Field of Classification Search .................. 382/225, 382/166

See application file for complete search history.

(56) References Cited

U.S. PATENT DOCUMENTS

| | | | |
|---|---|---|---|
| 6,539,126 B1 * | 3/2003 | Socolinsky et al. | 382/274 |
| 2004/0218812 A1 * | 11/2004 | Douglass | 382/166 |
| 2005/0228591 A1 * | 10/2005 | Hur et al. | 702/19 |

OTHER PUBLICATIONS

Ronald R. Coifman, Stephane Lafon, Diffusion maps, Applied and Computational Harmonic Analysis, vol. 21, Issue 1, Diffusion Maps and Wavelets, Jul. 2006, pp. 5-30, ISSN 1063-5203, DOI: 10.1016/j.acha.2006.04.006.*

RR Coifman, S. Lafon, AB Lee, M. Maggioni, B. Nadler, F. Warner, and SW Zucker. Geometric diffusions as a tool for harmonic analysis and structure definition of data: Diffusion maps. Proceedings of the National Academy of Sciences, 102(21):7426-7431, 2005.*

B. Nadler, S. Lafon, R.R. Coifman, Diffusion maps, spectral clustering and reaction coordinates of stochastic dynamical systems, Appl. Comput. Harmon. Anal. (2006).*

Weiss, Y. (1999) Segmentation Using Eigenvectors: a Unifying View, Proceedings of the Institute of Electrical and Electronics Engineers International Conference on Computer Vision, pp. 975-982.*

R.R. Coifman, M. Maggioni, Diffusion wavelets, Appl. Comput. Harmon. Anal. (2004), in press.*

Manduca, A.; , "Multispectral image visualization with nonlinear projections," Image Processing, IEEE Transactions on , vol. 5, No. 10, pp. 1486-1490, Oct. 1996 doi: 10.1109/83.536897.*

\* cited by examiner

*Primary Examiner* — Hadi Akhavannik

(57) ABSTRACT

Methods for dimensionality reduction of large data volumes, in particular hyper-spectral data cubes, include providing a dataset $\Gamma$ of data points given as vectors, building a weighted graph G on $\Gamma$ with a weight function $w_\epsilon$, wherein $w_\epsilon$ corresponds to a local coordinate-wise similarity between the coordinates in $\Gamma$; obtaining eigenvectors of a matrix derived from graph G and weight function $w_\epsilon$, and projecting the data points in $\Gamma$ onto the eigenvectors to obtain a set of projection values $\Gamma_B$ for each data point, whereby $\Gamma_B$ represents coordinates in a reduced space. In one embodiment, the matrix is constructed through the dividing each element of $w_\epsilon$ by a square sum of its row multiplied by a square sum of its column. In another embodiment the matrix is constructed through a random walk on graph G via a Markov transition matrix P, which is derived from $w_\epsilon$. The reduced space coordinates are advantageously used to rapidly and efficiently perform segmentation and clustering.

18 Claims, 15 Drawing Sheets

DIFFUSION BASES METHODS FOR SEGMENTATION AND CLUSTERING

FIELD AND BACKGROUND OF THE INVENTION

The present invention relates to image processing algorithms and particularly to algorithms used to process large data volumes ("cubes").

Two cube-generating applications relevant to the present invention are hyper-spectral imaging, which provides uniform (homogeneous) static datasets (USD), and use of monitoring systems, which provides heterogeneous dynamic datasets (HDD). The volumetric size depends both on the number of wavelengths/network activities and on the number of recorded samples. The main challenge is to reduce the dimensionality of the data, embedding it in a 2-3 dimensional space while preserving its original structure in its full dimensionality. Once the data is embedded, it is visualized in order to reveal and locate geometric meaningful structures (segments or clusters).

"Uniform" data include pixels in images/video and pixels in hyper-spectral images. The basic elements in USDs are all pixel-based. Finding uniform areas ("segments") in USDs is called "segmentation". Usually, uniform data is captured by a hyper-spectral camera and the watched area is viewed at many wavelengths beyond the classical red, green and blue. In this case, the data is called spectral and it is segmented in the spectrum (spectral) domain of the dataset. In classical image processing, segmentation can be done in still/video images where the data volume is composed from three planes of images: red, green and blue.

In contrast with uniform data, "heterogeneous" data consist of elements assembled from numbers that have different meanings and different scales. These may be collections of numbers sampled from different counters, where each number has a different nature, meaning and scale. Examples include activities of a network or a piece of equipment sampled periodically, or computer performance monitoring. In this case, finding similar areas that identify common (similar) trends is called clustering and the areas are called clusters. HDDs are constantly changed in time and processed and analyzed in two phases:

a) Learning phase: Normal data activities are studied and the data parameters are extracted. This is performed once or a very limited number of times during the day.

b) Prediction phase: Based on the learning phase, each new record of data that arrives in a time unit is analyzed to determine whether it belongs to normal behavior or whether it deviates from it. The latter case might be an indication of a problem buildup. This phase predicts and classifies the behavior of this dynamic dataset.

Automatic segmentation/clustering of still images is known. Segmentation methods can be divided into graph-based techniques, boundary-based methods, region-based methods and hybrid methods. Graph-based methods and/or boundary-based methods are discussed for example in J. Shi and J. Malik in "Normalized cuts and image segmentation". *IEEE Transactions on Pattern Analysis and Machine Intelligence,* 22(8):888-905, August 2000, (hereinafter SMALIK). Region-based methods are discussed for example in Y.-L. Chang and X. Li, "Adaptive image region-growing", *IEEE Transactions on Image Processing,* 3(6):868-872, 1994. These methods fail to produce a satisfactory segmentation in the presence of noise. Hybrid methods improve the segmentation results by combining the advantages of different techniques. Hybrid techniques gain their advantage by incorporating both global (histogram) and local (regions and boundaries) information. Exemplary hybrid methods are described by L Vincent and P Soille in "Watersheds in digital spaces: an efficient algorithm based on immersion simulations", *IEEE Transactions on Pattern Analysis and Machine Intelligence,* 13(6):583-598, 1991); E. Navon, O. Miller, and A. Averbuch in "Color image segmentation based on adaptive local thresholds", *Image and Vision Computing,* 23(1):69-85, January 2004, (hereinafter STILLS);

None of the segmentation/clustering methods which are described above are intended for segmentation/clustering of hyper-spectral data volumes. Some algorithms, which are used for specific image processing tasks such as segmentation, can be extended to handle hyper-spectral data volumes. The normalized cuts algorithm SMALIK can be extended in a straightforward manner to handle hyper-spectral data. However, this method uses a pixel similarity matrix without attempting to reduce the dimensionality of the data, which renders it to be computationally expensive.

Classical techniques for dimensionality reduction such as Principal Component Analysis (PCA)—(Jonathon D. Shlens, "Tutorial on Principal Component Analysis") and Multidimensional Scaling (MDS)—(H. Klock, J. M. Buhmann—Data Visualization by Multidimensional Scaling—A Deterministic Annealing Approach, Technical Report IAI-TR-96-8 Institut für Informatik III.), are simple to implement and can be efficiently computed. However, they only guarantee to discover the true structure of data in case it lies on or near a linear subspace of the high-dimensional input. PCA finds a low-dimensional embedding of the data points that best preserves their variance as measured in the high-dimensional input space. Classical MDS finds an embedding that preserves the inter-point distances, and is equivalent to PCA when these distances are the Euclidean distances. However, the pitfall of these methods is that they are global i.e. they take into account the distances between every pair of points. This makes them highly sensitive to noise. Furthermore, many datasets contain nonlinear structures that can not be detected by PCA and MDS.

Improved dimensionality reduction methods are exemplarily discussed by S. T. Roweis and L. K. Saul, "Nonlinear dimensionality reduction by locally linear embedding", *Science,* 290:2323-2326, December 2000 (hereinafter LLE)) and V. de Silva J. B. Tenenbaum and J. C. Langford, "A global geometric framework for nonlinear dimensionality reduction", *Science,* 290:2319-2323, December 2000 (hereinafter ISOMAP)). The LLE algorithm attempts to discover nonlinear structure in high dimensional data by exploiting the local symmetries of linear reconstructions. The ISOMAP approach builds on classical MDS but seeks to preserve the intrinsic geometry of the data, as captured by the geodesic manifold distances between all pairs of data points.

Recently, R. R. Coifman and S. Lafon, introduced a manifold learning scheme known as Diffusion Maps or DMAPS (*Applied and Computational Harmonic Analysis,* 21:5-30, July 2006). DMAPS embed high dimensional data into a Euclidean space of substantially smaller dimension while preserving the geometry of the data set. The global geometry is preserved by maintaining the local neighborhood geometry of each point in the data set—a property it shares with LLE and ISOMAP. However, DMAPS use a random walk distance that is more robust to noise as it takes into account all the paths between a pair of points. Furthermore, DMAPS can provide parameterization of the data when only a point-wise similarity matrix is available. This may occur either when there is no access to the original data or when the original data consists of abstract objects. Given a set of data points (original dataset of vectors in $\mathbb{R}^n$) $\Gamma=\{x_i\}_{i=1}^m, x_i \in \mathbb{R}^n$, the DMAPS algorithm includes the following steps:

1. Building a graph G on $\Gamma$ with a weight function $w_\epsilon$ that corresponds to the local point-wise similarity between the points in $\Gamma^{-1}$.
2. Construction of a random walk on the graph G via a Markov transition matrix P which is derived from $w_\epsilon$.
3. Performing a spectral decomposition of P.

By designing a local geometry that reflects quantities of interest, it is possible to construct a diffusion operator whose spectral decomposition enables the embedding of $\Gamma$ into a space S of substantially lower dimension. The Euclidean distance between a pair of points in the reduced space defines a diffusion metric that measures the proximity of points in terms of their connectivity in the original space. Specifically, the Euclidean distance between a pair of points, in S, is equal to the random walk distance between the corresponding pair of points in the original space. The Euclidean distance of two vectors $a=(a_1, a_2, \ldots, a_n)$, $b=(b_1, b_2, \ldots, b_n)$ in $\mathbb{R}^n$, is given by $$\|a-b\| = \sqrt{\sum_{i=1}^n (a_i - b_i)^2}.$$

The eigenvalues and eigenvectors of P define a natural embedding of the data through the diffusion map. Furthermore, the study of the eigenvalues allows the use of the eigenvectors for dimensionality reduction.

The graph and the weight function are formed in the following way: Let $\Gamma=\{x_1, \ldots, x_n\}$ be a set of points in $R^n$. The graph $G(V,E)$, $|V|=m, |E|<<m^2$ is constructed on $\Gamma$ in order to study the intrinsic geometry of this set. A weight function $w_\epsilon(x_i, x_j)$ is introduced which measures the pairwise similarity between the points. The weight function is given as an n×n matrix. For each pair of points $x_i, x_j \in \Gamma$, the weight function has the following properties:

symmetry: $w_\epsilon(x_i, x_j) = w_\epsilon(x_j, x_i)$ non-negativity: $w_\epsilon(x_i, x_j) \geq 0$ fast decay: given a scale parameter $\epsilon>0$, $w_\epsilon(x_i, x_j) \to 0$ when $\|x_i - x_j\| >> \epsilon$ and $w_\epsilon(x_i, x_j) \to 1$ when $\|x_i - x_j\| << \epsilon$. The sparsity of G is a result of this property.

Note that the parameter $\epsilon$ defines a notion of neighborhood. In this sense, $w_\epsilon$ defines the local geometry of $\Gamma$ by providing a first-order pairwise similarity measure for $\epsilon$-neighborhoods of every point $x_i$. One of the common choices for $w_\epsilon$ is $$w_\epsilon(x_i, x_j) = e^{-\|x_i - x_j\|^2/\epsilon} \quad (1)$$

where e denotes the natural exponent. However, other weight functions can be used and the choice of the weight function essentially depends on the application at hand. Data driven heuristics for choosing $\epsilon$ are described later.

A Markov transition matrix is constructed as follows. The non-negativity property of $w_\epsilon$ allows it to be normalized into a Markov transition matrix P where the states of the corresponding Markov process are the data points. This enables the analysis of $\Gamma$ via a random walk. The construction of P is described in pages 14-15 of F. R. K. Chung, "*Spectral Graph Theory*", AMS Regional Conference Series in Mathematics, 92, 1997, (hereinafter CHUNG).

Formally, $P=\{(p(x_i, x_j)\}_{i,j=1,\ldots,m}$ is constructed as follows:

$$p(x_i, x_j) = \frac{w_\epsilon(x_i, x_j)}{d(x_i)} \quad (2)$$

where $$d(x_i) = \sum_{j=1}^m w_\epsilon(x_i, x_j) \quad (3)$$

is the degree of $x_i$. P is a Markov matrix since the sum of each row in P is 1 and $p(x_i, x_j) \geq 0$. Thus, $p(x_i, x_j)$ can be viewed as the probability to move from $x_i$ to $x_j$ in a single time step. By raising this quantity to a power t, this influence is propagated to nodes in the neighborhood of $x_i$ and $x_j$ and the result is the probability for this move in t time steps. This probability is denoted by $p_t(x_i, x_j)$. These probabilities measure the connectivity of the points within the graph. The parameter t controls the scale of the neighborhood in addition to the scale control provided by $\epsilon$.

The close relation between the asymptotic behavior of P, i.e. its spectral properties and the clusters that are inherent in the data, was explored in CHUNG. Spectral decomposition is performed as follows. The left and the right eigenvectors of P are denoted by $\{\mu_k\}_{k=1,\ldots,m}$ and $\{v_k\}_{k=1,\ldots,m}$, respectively. A right eigenvector r and a right eigenvalue $\rho$ of a matrix M are ones that solve the equation $Mr = \rho r$. A left eigenvector l and a left eigenvalue $\zeta$ of a matrix M are ones that solve the equation $lM = \zeta l$. Let $\{\lambda_k\}_{k=1,\ldots,m}$ be the right eigenvalues of P where $|\lambda_1| \geq |\lambda_2| \geq \ldots \geq |\lambda_m|$.

It is well known that $$\lim_{t \to \infty} p_t(x_i, x_j) = \mu_1(x_j).$$

A. Lee M. Maggioni B. Nadler F. Warner R. Coifman, S. Lafon and S. Zucker, "Geometric diffusions as a tool for harmonics analysis and structure definition of data: Diffusion maps", *Proceedings of the National Academy of Sciences*, volume 102, pages 7426-7431, May 2005, (hereinafter PNAS)) show that for a finite time t one has $$p_t(x_i, x_j) = \sum_{k=1}^m \lambda_k^t v_k(x_i) \mu_k(x_j). \quad (4)$$

A fast decay of $\{\lambda_k\}$ is achieved by an appropriate choice of $\epsilon$. Thus, only a few terms are required in the sum in Eq. 4, to achieve a relative accuracy $\eta(\delta)$ of $\delta>0$. Coifman and Lafon in DMAPS introduced the diffusion distance $$D_t^2(x_i, x_j) = \sum_{k=1}^m \frac{(p_t(x_i, x_k) - p_t(x_k, x_j))^2}{\mu_1(x_k)}$$

This formulation is derived from the known random walk distance in Potential Theory: $D_t^2(x_i, x_j) = p_t(x_i, x_i) + p_t(x_j, x_j) - 2p_t(x_i, x_j)$.

Averaging along all the paths from $x_i$ to $x_j$ results in a distance measure that is more robust to noise and topological short-circuits than the geodesic distance or the shortest-path distance. Finally, the diffusion distance can be expressed in terms of the right eigenvectors of P (see PNAS for a proof):

$$D_t^2(x_i, x_j) = \sum_{k=2}^{m} \lambda_k^{2t}(v_k(x_i) - v_k(x_j))^2.$$

The sum starts from 2 because $v_1$ is constant and therefore does not contribute to the sum. It follows that in order to compute the diffusion distance, one can simply use the right eigenvectors of P. Moreover, this facilitates the embedding of the original points in a Euclidean space $\mathbb{R}^{\eta(\delta)-1}$ by:

$$\Xi_t: x_i \to (\lambda_2{}^t v_2(x_i), \lambda_3{}^t v_3(x_i), \ldots, \lambda_{\eta(\delta)}{}^t v_{\eta(\delta)}(x_i)).$$

This also provides coordinates on the set $\Gamma$. Essentially, $\eta(\delta) \ll n$ due to the fast spectral decay of the spectrum of P. Furthermore, $\eta(\delta)$ depends only on the primary intrinsic variability of the data as captured by the random walk and not on the original dimensionality of the data. This data-driven method enables the parameterization of any set of points—abstract or not—provided the similarity matrix of the points $w_\epsilon$ is available.

The prior art on segmentation, clustering and dimensionality reduction, lacks an algorithm that has all of the following properties:

Performs both segmentation and clustering using a unified approach.
Handles a diversity of datasets such as USD and HDD.
Requires a very small number of parameters.
Robust to noise.
Fast.
Requires a small amount of memory.

Accordingly, there is a need for, and it would be advantageous to have a segmentation, clustering and dimensionality reduction algorithm that has all the properties mentioned as lacking in prior art.

SUMMARY OF THE INVENTION

The present invention provides a basic technology that offers a coherent methodology to efficiently handle both USDs and HDDs. While the invention is described in detail with reference to processing USDs, it can equally well be applied to HDD problems. For example, the algorithm disclosed in this invention can detect buildups that lead to computer crashes and reveal correlations between different measured quantities.

The present invention relates to a general framework for automatic segmentation and clustering of hyper-spectral volumes. The framework is somewhat related to the DMAPS scheme. The inventive differences between the two are clarified hereinbelow. The present approach provides a coherent methodology that projects the hyper-spectral cube onto a space of substantially smaller dimension while preserving its geometrical structure in the lower dimensional space. It also provides a novel segmentation/clustering approach that is tailored for the data in the dimension-reduced space. The invention distinguishes between segmentation/clustering of areas that contain more than one pixel (above-pixel segmentation/clustering) and sub-pixel segmentation common in remote sensing (e.g. spectral images captured from planes, satellite, etc). The algorithms for both segmentation/clustering types include two steps. A first step of dimensionality reduction is common to both. However, the second step is different: sub-pixel segmentation/clustering is accomplished by applying a local variance detection scheme while above-pixel segmentation/clustering uses a histogram-based method to segment/cluster hyper-pixels in the reduced-dimensional space. The algorithm disclosed herein is faster than the current state-of-the-art techniques for segmentation/clustering, automatic (no supervision) and robust to noise. Thus, there is no need for a preprocessing de-noising stage.

The invention provides a framework based on diffusion processes for finding meaningful geometric descriptions in data sets. The proposed framework relates the spectral properties of Markov processes to their geometric counterparts. It enables to reduce the dimensionality of data and embed it into smaller subspaces where all the requested and sought-after information lies, while the geometric coherency of the dataset is preserved in the dimension-reduced subspaces. It also enables to discover meaningful visual connections in huge data sets.

According to the present invention there is provided a method for dimensionality reduction of large data volumes including the steps of: providing a dataset $\Gamma$ of data points given as vectors; building a weighted graph G on $\Gamma$ with a weight function $w_\epsilon$, wherein $w_\epsilon$ corresponds to a local coordinate-wise similarity between the coordinates in $\Gamma$; constructing a random walk on graph G via a Markov transition matrix P, which is derived from $w_\epsilon$; performing a spectral decomposition of P to obtain right and left eigenvectors of P; and projecting the data points in $\Gamma$ onto the right eigenvectors of P to obtain a set of projection values $\Gamma_B$ for each data point, whereby $\Gamma_B$ represents coordinates in a reduced space.

According to the present invention there is provided a method for dimensionality reduction of large data volumes including the steps of: providing a dataset $\Gamma$ of data points given as vectors; building a weighted graph G on $\Gamma$ with a weight function $w_\epsilon$, wherein $w_\epsilon$ corresponds to a local coordinate-wise similarity between the coordinates in $\Gamma$; constructing a matrix A which is the result of dividing each element of $w_\epsilon$ by a square sum of its row multiplied by a square sum of its column; performing a spectral decomposition of matrix A to obtain the eigenvectors of A; and projecting the data points in $\Gamma$ onto the eigenvectors of A to obtain a set of projection values $\Gamma_B$ for each data point, whereby $\Gamma_B$ represents coordinates in a reduced space.

BRIEF DESCRIPTION OF THE DRAWINGS

The invention is herein described, by way of example only, with reference to the accompanying drawings, wherein.

DESCRIPTION OF THE PREFERRED EMBODIMENTS

Diffusion Bases and the Segmentation/Clustering Algorithm

Diffusion Bases (DB)

The present invention discloses a novel algorithm named "diffusion bases" (DB), which complements the DM algorithm in the sense that it explores the variability among the coordinates of the original data. Both algorithms share a Markov transition matrix construction. However, the DB algorithm uses the eigenvectors of the Markov transition matrix as an orthonormal system and projects the original data on the orthonormal system. The DB algorithm also assumes that there is access to the original data.

Figure 1A:
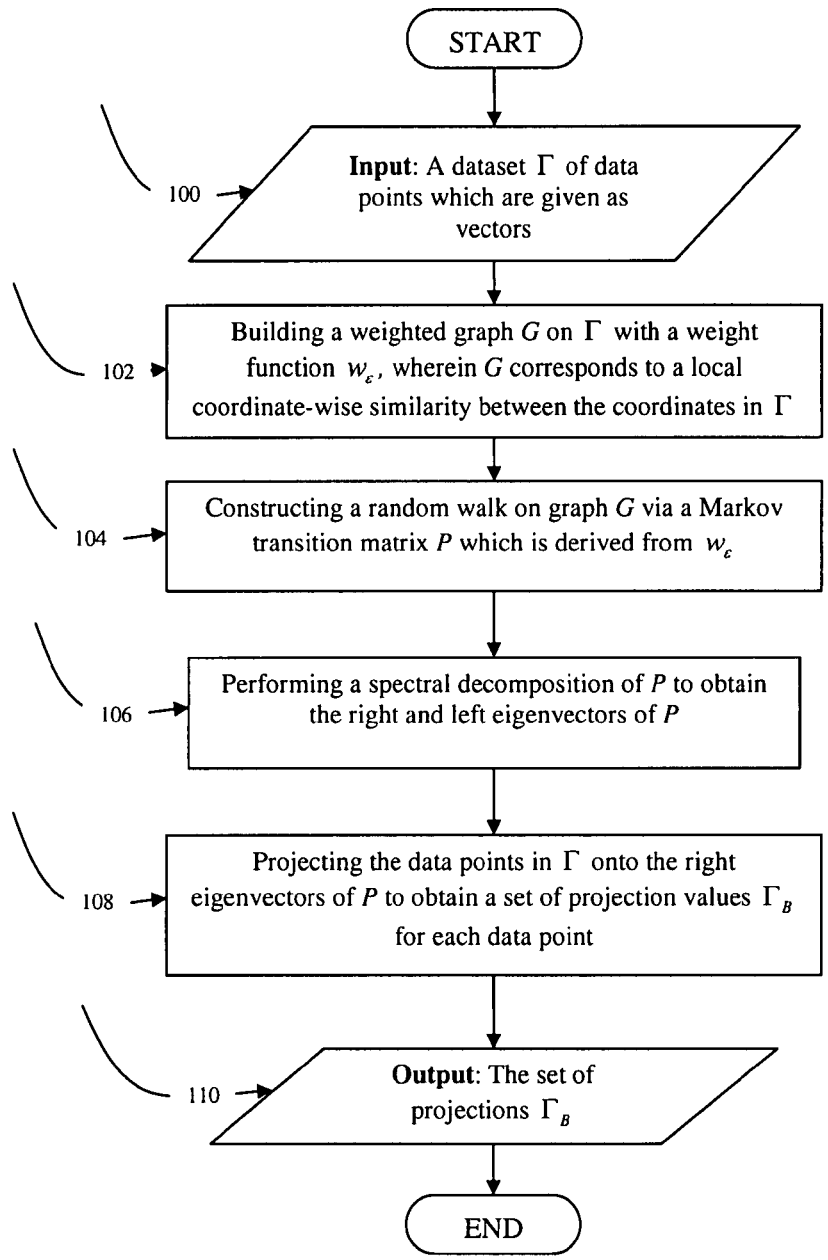
FIG. 1A shows the main steps of a first embodiment of the diffusion bases (DB) algorithm according to the present invention.

FIG. 1a shows the main steps of a first embodiment of the DB algorithm. A dataset $\Gamma$ of data points which are given as vectors is provided in step 100. A graph G is then built on $\Gamma$ with a weight function $w_\epsilon$ in step 102. The weight function corresponds to the local coordinate-wise similarity between the coordinates in $\Gamma$. A random walk is constructed on graph G via a Markov transition matrix P which is derived from $w_\epsilon$ in step 104. A spectral decomposition of P is performed in step 106, and the data points in $\Gamma$ are projected onto the eigenvectors of P in step 108. The set of projections $\Gamma_B$ is then output in step 110.

Figure 1B:
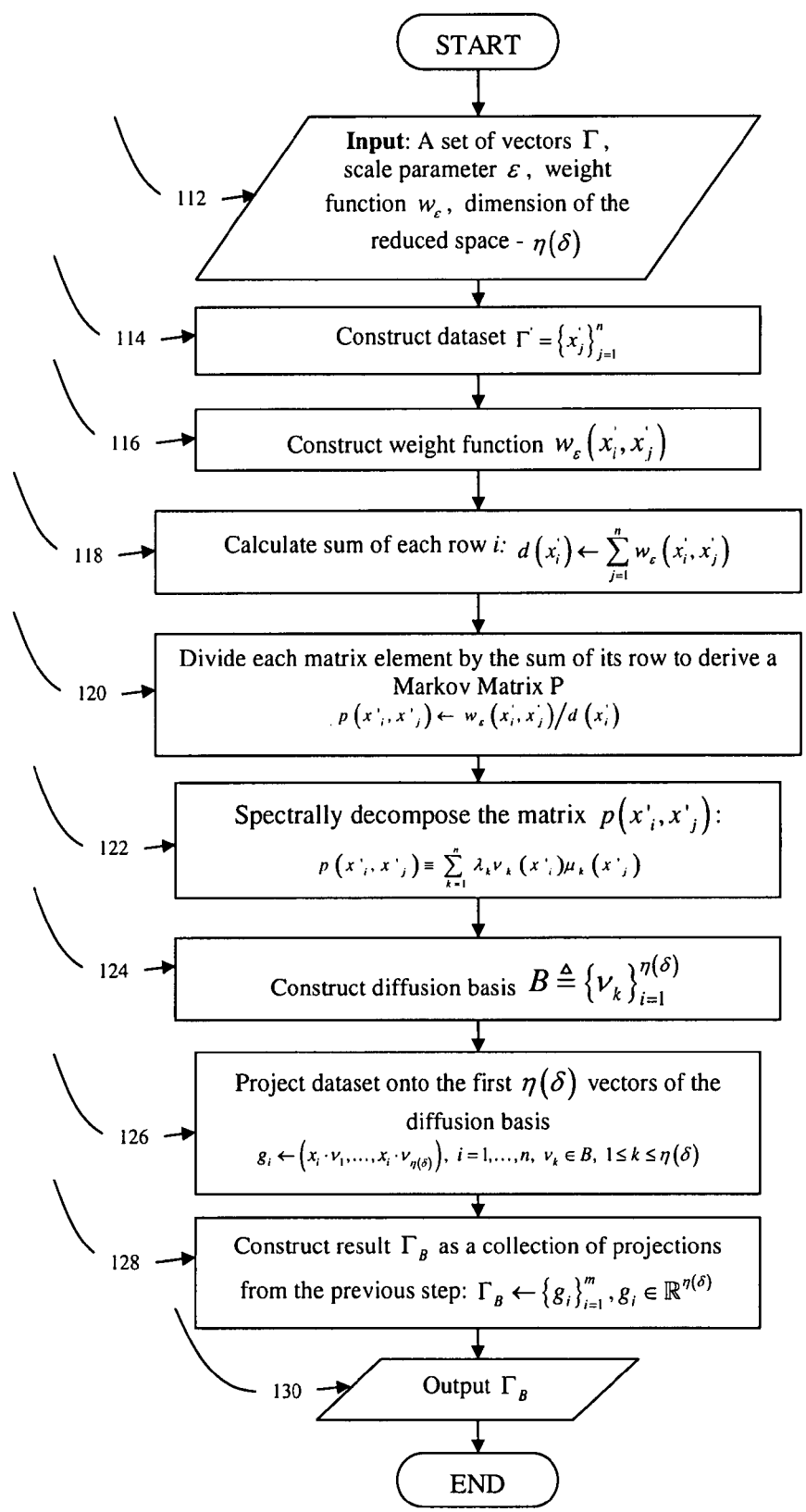
FIG. 1B shows more details of the steps in the algorithm of FIG. 1A.

FIG. 1b provides more details of the steps in FIG. 1a. The dataset $\Gamma$, the scale parameter $\epsilon$, the weight function $w_\epsilon$ and the dimension of the reduced space $\eta(\delta)$ are input in step 112 to the DB algorithm. Let $\Gamma = \{x_i\}_{i=1}^m, x_i \in \mathbb{R}^n$ be the original dataset of vectors in $\mathbb{R}^n$ and let $x_i(j)$ denote the $j^{th}$ coordinate of $x_i$, $1 \leq j \leq n$. The vector $x_j' \triangleq (x_1(j), \ldots, x_m(j))$ is defined to be the $j^{th}$ coordinate of all the vectors in $\Gamma$. If a matrix M is constructed so that the i-th row is composed of $x_i$, then $x'_j$ is the j-th row of the transpose of matrix M. The $x'_j$ vectors are used to construct a coordinate-based dataset $\Gamma' = \{x_j'\}_{j=1}^n$ in step 114. In inventive contrast with the DMAPS method, the construction and use of a coordinate dataset instead of a point dataset simplifies and speeds up the data processing, because the processing is applied to a dimensionality of the points—n—instead of the size of the set $\Gamma$—m—where almost always m is bigger than n by orders of magnitude. The DMAPS algorithm is executed on $\Gamma'$ using the parameters $w_\epsilon$, $\epsilon$ and $\eta(\delta)$. A weight function is calculated as described in Eq 1 in step 116. A Markov transition matrix P is then constructed in steps 118 and 120 as described in Eq 2, 3. In particular, the sum of weights for each point $x_i$ (i.e. the sum of each row i) is calculated in step 118 and each row is divided by its sum in step 120 to obtain matrix P. P is then spectrally decomposed in step 122, as described in Eq 4. The right eigenvectors of P, $\{v_k\}_{k=1,\ldots,n}, v_k \in \mathbb{R}^n$, constitute an orthonormal basis. The spectral decay property of the spectral decomposition is then used to extract only the first $\eta(\delta)$ eigenvectors to construct the diffusion basis B in step 124.

$$B \triangleq \{v_k\}_{k=1,\ldots,\eta(k)}. \quad (5)$$

Note that the first eigenvector in not excluded in contrast with the DMAPS algorithm. The original dataset $\Gamma$ is then projected onto basis B in step 126 and 128. The set of these projections is given by $$\Gamma_B \{g_i\}_{i=1}^m, g_i \in \mathbb{R}^{\eta(\delta)} \quad (6)$$

where $$g_i \triangleq (x_i \cdot v_1, \ldots, x_i \cdot v_{\eta(\delta)}), i = 1, \ldots, n \quad (7)$$

and · denotes the inner product operator i.e. given two vectors $a = (a_1, a_2, \ldots, a_n)$, $b = (b_1, b_2, \ldots, b_n)$ in $\mathbb{R}^n$, their inner product is given by $$a \cdot b = \sum_{i=1}^n a_i b_i \cdot \Gamma_B$$

contains the coordinates of the original points in the orthonormal system whose axes are given by B. Alternatively, $\Gamma_B$ can be interpreted in the following way: the coordinates of $g_i$ contain the correlation between $x_i$ and the directions given by the vectors in B. Finally, the projected data $\Gamma_B$ is output in step 130. The eigenvectors $\{v_k\}_{k=1,\ldots,n}, v_k \in \mathbb{R}^n$ capture the non-linear coordinate-wise variability of the original data. This bares some similarity to the well known Principal Component Analysis (PCA) algorithm. However, the diffusion process yields a more accurate estimation of the variability than PCA due to its ability to capture non-linear manifolds within the data by local exploration of each coordinate and its robustness to noise. Furthermore, this process is more general than PCA and it coincides with it when the weight function $w_\epsilon$ is linear. Furthermore, DB is fast, requires a small amount of memory and provides a unified approach for performing both segmentation and clustering as demonstrated below. Moreover, it can handle a diversity of datasets such as USD and HDD and it requires a very small number of parameters.

Numerical Enhancement of the Spectral Decomposition

The Markov matrix obtained in Eq. 2, is not symmetric. Working with a symmetric matrix is faster and more accurate. A symmetric matrix $A=(a_{ij})$, which is spectrally related to $w_\epsilon$, can be obtained in the following way:

$$a(x_i', x_j') \triangleq \frac{w_\epsilon(x_i', x_j')}{\sqrt{d(x_i')}\sqrt{d(x_j')}} \tag{8}$$

where $d(x_i)$ and $d(x_j)$ are defined in Eq. 3. Let $\{\theta_k\}_{k=1}^m$ be the eigenvectors of A. It is known that P and A have the same eigenvalues and that $$v_k = \frac{\vartheta_k}{\vartheta_1}$$

and $$\mu_k = \vartheta_k \vartheta_1$$

where the division and multiplication are done element by element and where $\{\mu_k\}$ and $\{v_k\}$ are the left and right eigenvectors of P, respectively. Thus $$p_t(x_i', x_j') = \sum_{k=1}^n \lambda_k^t \vartheta_k(x_i') \vartheta_k(x_j'). \tag{9}$$

Figure 2A:
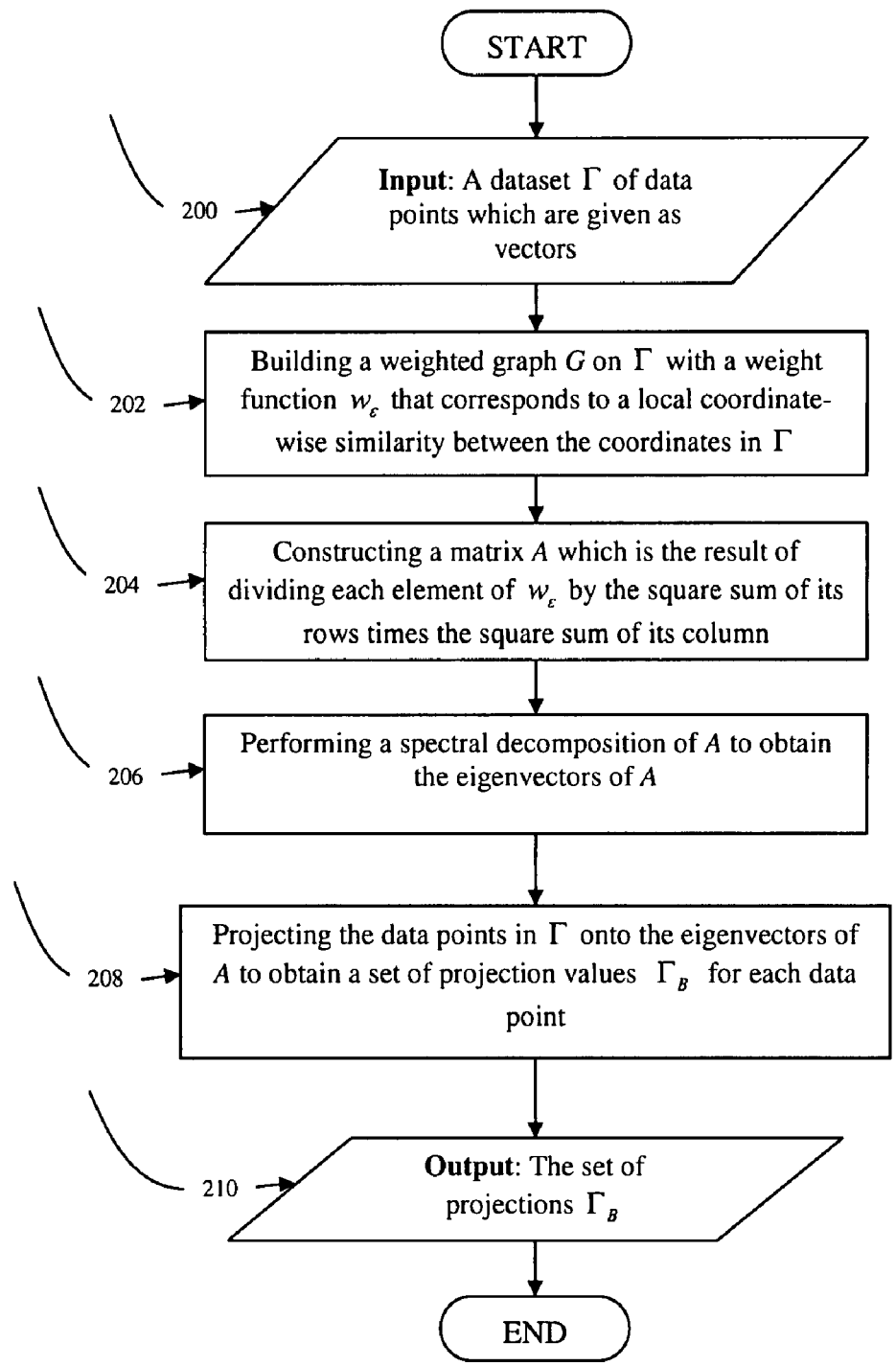
FIG. 2A shows the main steps of a second embodiment of the diffusion bases (DB) algorithm according to the present invention.

This leads to a modification of the DB algorithm of FIG. 1a, shown in FIG. 2a. The modified algorithm projects the hyper-pixels onto the orthonormal basis $$B \triangleq \{\theta_k\}_{k=1,\ldots\eta(\delta)} \tag{10}$$

instead of projecting them onto $\{v_k\}_{k=1}^{\eta(\delta)}$, as in Eq. 7, where the number $\eta(\delta)$ was introduced above. Hence, the projection is given by $\Gamma_B = \{g_i\}_{i=1}^m$; $g_i \in \mathbb{R}^{\eta(\delta)}$ where $$g_i = (x_i' \cdot \theta_1, \ldots, x_i' \cdot \theta_{\eta(\delta)}), i=1, \ldots, n \tag{11}$$

and · denotes the inner product operator as defined above.

FIG. 2a shows the main steps of a second embodiment of the DB algorithm according to the present invention. This is a "modified" DB algorithm with steps similar to that in FIG. 1a (i.e. steps 200, 202 match steps 100, 102 therein) except for the third step (204). The main difference vs. algorithm of FIG. 1a is that instead of constructing a Markov matrix P as in 104, step 204 constructs a matrix A which is the result of dividing each element of $w_\epsilon$ by the square sum of its row times the square sum of its column.

Figure 2B:
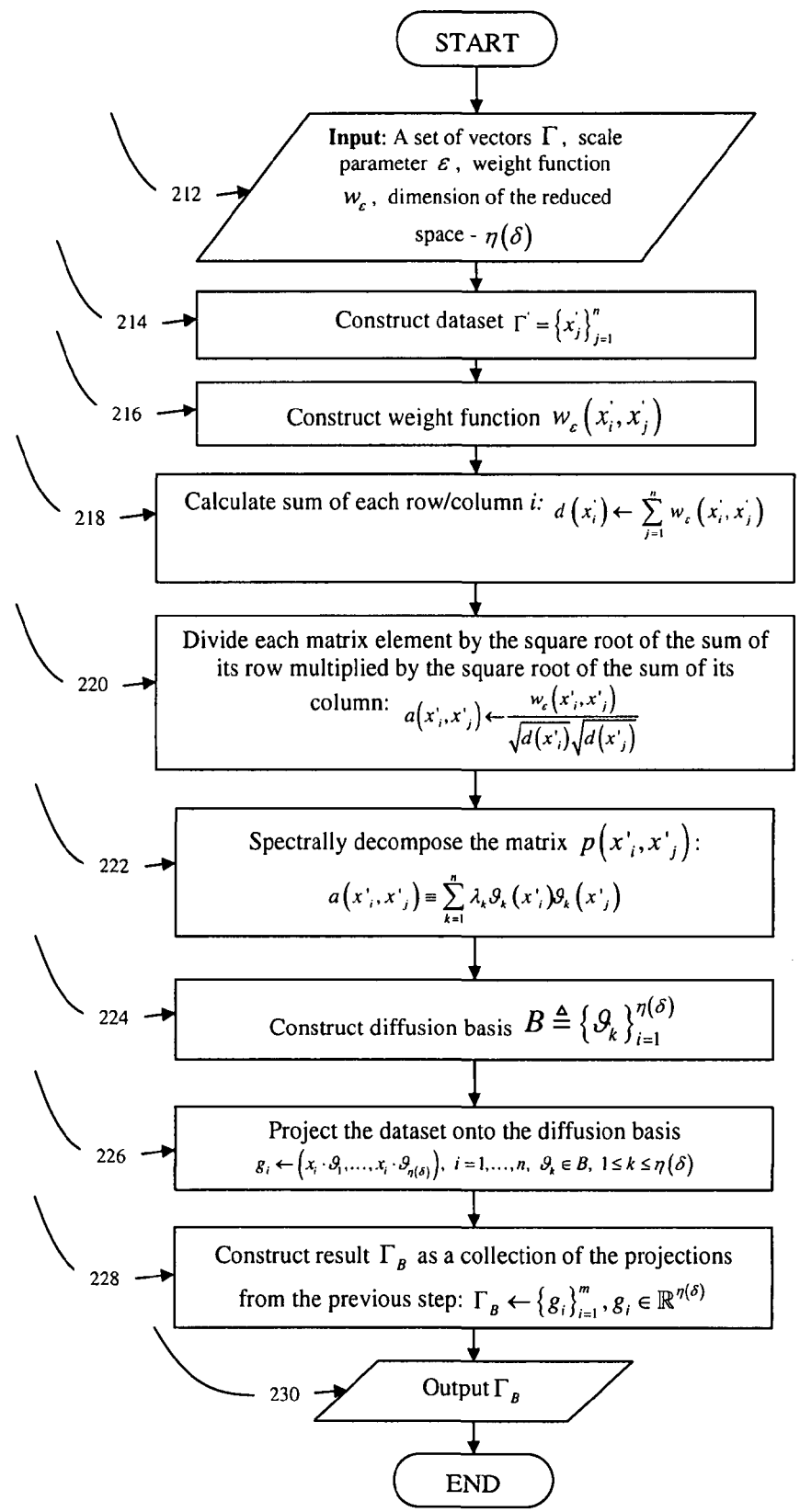
FIG. 2B shows more details of the steps in the algorithm of FIG. 2A.

FIG. 2b describes in more detail the modified algorithm. Steps 212-218 are identical to steps 112-118. Dataset Γ, weight function $w_\epsilon$, scale parameter $\epsilon$ and the dimension of the reduced space $\eta(\delta)$ are input to the modified algorithm in step 212. A dataset $\Gamma' = \{x_j'\}_{j=1}^n$ is constructed in step 214. The weight function is calculated for Γ' in step 216, as described in Eq. 1. Matrix A is then constructed in steps 218 and 220 following respectively Eqns. 3 and 8. A is spectrally decomposed according to Eq. 9 in step 222. The DB is constructed as described in Eq. 10 in step 224. The original data is projected on the DB in steps 226 and 228 according to respectively Eqns. 6 and 11. The projected data is then output in step 230.

Note that steps 102, 108 in FIG. 1a, steps 114, 126, 128 in FIG. 1b, steps 202, 208 in FIG. 2a and steps 214, 226 and 228 in FIG. 2b are key inventive steps of the method disclosed herein, in particular vs. the DMAPS method.

Wavelength-Wise Global (WWG) Algorithm for Above-Pixel Segmentation

A novel two-phase approach that uses the DB algorithm (in either embodiment of FIGS. 1 and 2) for the segmentation of hyper-spectral images is described next. The first phase reduces the dimensionality of data using the DB algorithm. The second phase applies a histogram-based method to cluster the low-dimensional data. The first phase may also be used independently of the second to reduce the dimensionality of any uniform data set.

Figure 3:
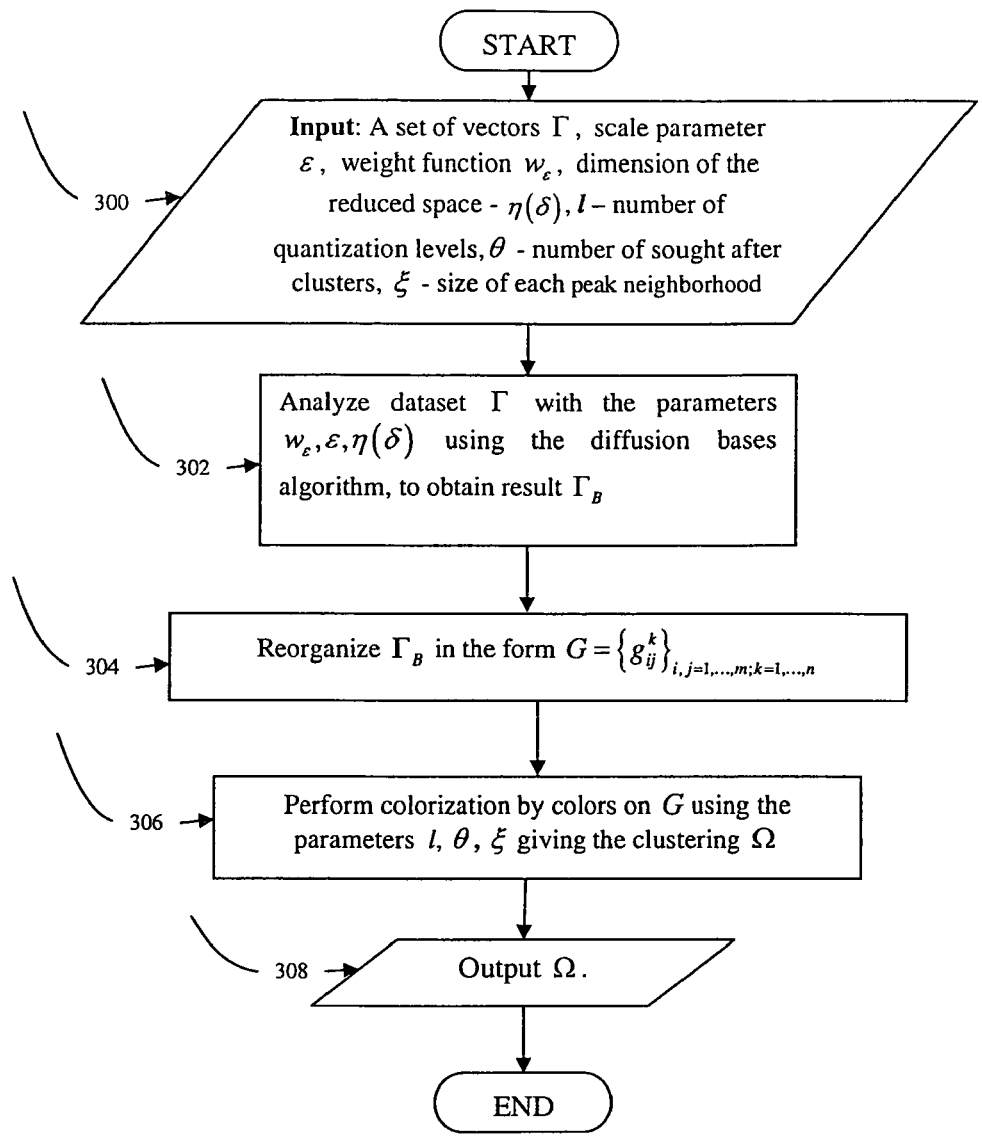
FIG. 3 shows a flowchart of the main steps of hyper-spectral segmentation using the DB algorithm of the present invention, as applied to a dataset of vectors $\Gamma$.

FIG. 3 shows a flowchart of the main steps of hyper-spectral segmentation using the DB algorithm of the present invention, as applied to a dataset of vectors Γ. Γ, $\epsilon$, $w_\epsilon \eta(\delta)$ (as in FIGS. 1 and 2), a number of quantization levels l, a number of sought after clusters θ and a size of each peak neighborhood ξ are input to the algorithm in step 300. Dataset Γ is analyzed using parameters $\epsilon$, $w_\epsilon$, $\eta(\delta)$ by the DB algorithm in step 302 to produce a reduced dimensionality (projection on basis B) dataset $\Gamma_B$. $\Gamma_B$ is reorganized in the form described in Eq. 12 to produce $G = \{g_{ij}^k\}_{i,j=1,\ldots,m;k=1,\ldots,m}$ in step 304. Clustering by colors is then performed on G using the parameters l, θ and ξ. This produces a clustering Ω in step 306, and Ω is output in step 308. Note that in FIG. 3, steps 102-110 are bunched in step 302.

A hyper-spectral image is modeled as a three dimensional cube where the first two coordinates correspond to the position (x,y) and the third coordinate corresponds to the wavelength $\lambda_k$. Let $$I = \{p_{ij}^{\lambda_k}\}_{i,j=1,\ldots,m;k=1,\ldots,n} \in \mathbb{R}^{m \times m \times n} \tag{12}$$

be a hyper-spectral image cube, where n is the number of wavelengths and the size of the image is m×m. For notation simplicity, assume that the images are square. It is important to note that almost always n<<m². I can be viewed in two ways:

1. Wavelength-wise: I is a collection of n two-dimensional images. Let $$I^{\lambda_l} \triangleq \{p_{ij}^{\lambda_l}\} \in \mathbb{R}^{m \times m}, 1 \leq l \leq n \tag{13}$$

be a two-dimensional image that corresponds to wavelength $\lambda_l$.

2. Point-wise: I is a two dimensional matrix where every (x,y) coordinate is a vector. Let $$\vec{I}_{ij} \triangleq (p_{ij}^{\lambda_1}, \ldots, p_{ij}^{\lambda_n}) \in \mathbb{R}^n, 1 \leq i, j \leq m \tag{14}$$

be a vector at coordinates (i,j) of length n. $\vec{I}_{ij}$ is referred to as the hyper-pixel at position (x,y).

Phase 1: Reduction of Dimensionality via DB

Different sensors can produce values in different scales. Thus, in order to have a uniform scale for all the sensors, each image $I^{\lambda_k}$, $1 \leq k \leq n$, is normalized to be in the range [0,1] and the normalized result is given by $\tilde{I}^{\lambda_k}$, $1 \leq k \leq n$. Let $\tilde{I} = \{\tilde{p}_{ij}^{\lambda_k}\}_{i,j=1,\ldots,m;k=1,\ldots,n} \in \mathbb{R}^{m \times m \times n}$ be the hyper-spectral cube after the normalization. Set $\Gamma = \{\tilde{I}_{ij}\}$, $i, j=1, \ldots, m$ is formed from the hyper-pixels of $\tilde{I}$ as defined in Eqn. 14 and the DB algorithm is executed on Γ. The dimensionality can also be reduced using the modified version of the DB algorithm. In this case, the segmentation algorithm is referred to as the "modified-WWG" algorithm. In either case, the diffusion basis is given by B and the embedded points in the dimensional-reduced space are given by $\Gamma_B$.

Phase 2: Clustering by Colors

A histogram-based segmentation algorithm that extracts objects from Γ using $\Gamma_B$ is introduced next. For notational convenience, $\eta(\delta)-1$ is denoted hereinafter by $\eta$. G denotes the cube representation of the set $\Gamma_B$ in a similar setting given in Eq. 12:

$$G \triangleq \{g_{ij}^k\}_{i,j=1,\ldots,m;k=1,\ldots,\eta}, G \in \mathbb{R}^{m \times m \times \eta}.$$

A wavelength-wise setting for G is assumed next. Let $$\vec{g}_{ij} \triangleq (g_{ij}^1, \ldots, g_{ij}^\eta) \in \mathbb{R}^\eta, 1 \leq i,j \leq m$$

be a hyper-pixel in G and let $G^l$ $$G^l \triangleq \{g_{ij}^l\}_{i,j=1,\ldots,m} \in \mathbb{R}^{m \times m}, 1 \leq l \leq \eta$$

be a 2-D matrix that corresponds to the $l^{th}$ coordinate (color as defined later) of the hyper-pixels in G.

The coordinates of $\vec{g}_{ij}$ will be referred to hereinafter as colors.

The segmentation is achieved by clustering hyper-pixels with similar colors. This is based on the assumption that similar objects in the image will have a similar set of color vectors in $\Gamma_B$. These colors contain the correlations between the original hyper-pixels and the global inter-wavelength changes of the image. Thus, homogeneous regions in the image have similar correlations with the changes i close colors where closeness between colors is measured by the Euclidean distance.

The segmentation-by-colors algorithm consists of the following steps:

1. Normalization of the Input Image Cube G:

First, each layer of the color image cube is normalized to be between 0 and 1. Let $G^k$ be the $k^{th}$ (k is the color index and $1 \leq k \leq \eta$) layer of the image cube G. The normalization of $G^k$ is denoted by $\hat{G}^k = \{\hat{g}_{ij}^k\}_{i,j=1,\ldots,m}$ and defined to be $$\hat{g}_{ij}^k \triangleq \frac{g_{ij}^k - \min_{i,j}\{g_{ij}^k\}}{\max_{i,j}\{g_{ij}^k\} - \min_{i,j}\{g_{ij}^k\}}, 1 \leq k \leq \eta. \quad (17)$$

2. Uniform Quantization of the Normalized Input Image Cube $\hat{G}^k$:

Let $l \in \mathbb{N}$ be the given number of quantization levels. Every value in $G^k$ is uniformly quantized to be one of l possible values. The quantized matrix is given by Q:

$$Q \triangleq \{q_{ij}^k\}_{i,j=1,\ldots,m;k=1,\ldots,\eta}, q_{ij}^k \in \{1,\ldots,l\} \quad (18)$$

where $$q_{ij}^k = \lfloor l \cdot \hat{g}_{ij}^k \rfloor. \quad (19)$$

$\lfloor \cdot \rfloor$ is the truncation operator. The quantized color vector at coordinate (i,j) is denoted by $$\vec{c}_{ij} \triangleq (q_{ij}^1, \ldots, q_{ij}^\eta) \in \mathbb{R}^\eta, 1 \leq i,j \leq m. \quad (20)$$

3. Construction of the Frequency Color Histogram:

Next, the frequency function $f:\{1,\ldots,l\}^\eta \to \mathbb{N}$ is constructed, where for every $\kappa \in \{(1,\ldots,l\}^\eta, f(\kappa)$ is the number of quantized color vectors $\vec{c}_{ij}, 1 \leq i,j \leq \eta$, that are equal to $\kappa$.

4. Finding Peaks in the Histogram

Figure 4:
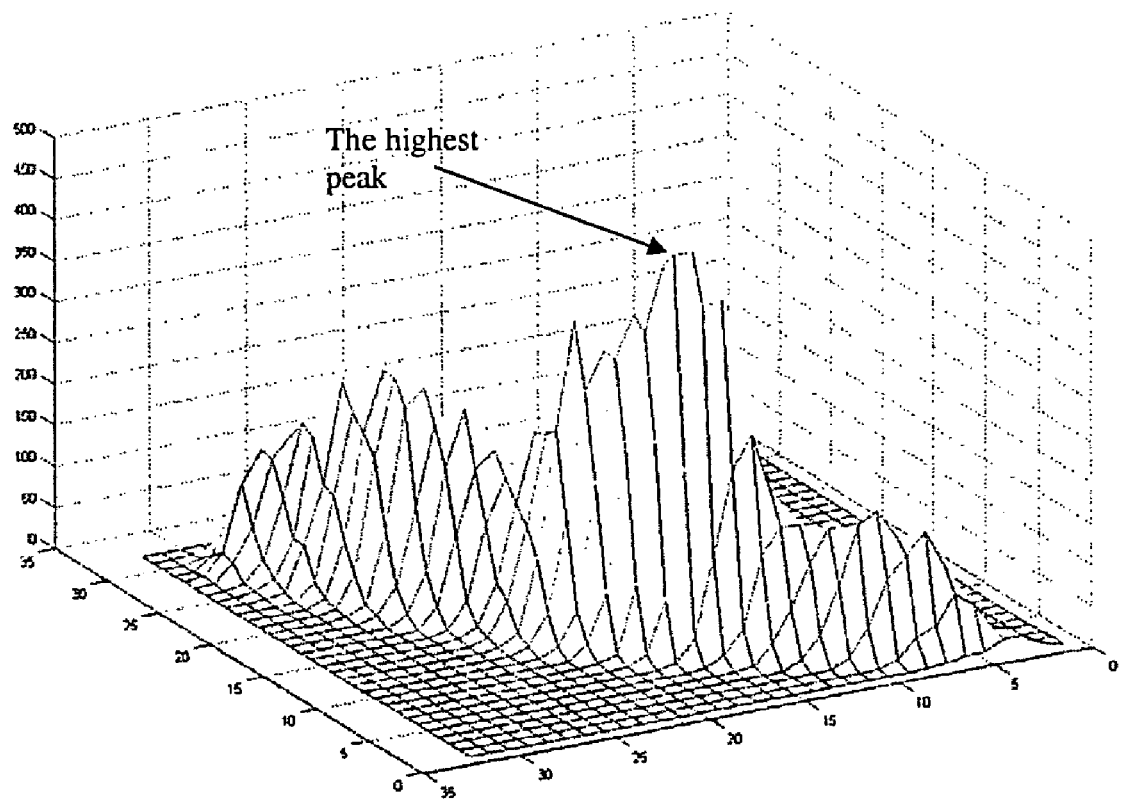
FIG. 4 shows an example of a frequency histogram with the highest peak marked.

Local maximum points (called peaks) of the frequency functions $f$ are detected. Each peak is assumed to correspond to a different object in the image cube G. The classical notion of segmentation—separating object from the background—is used here. Indeed, the highest peak corresponds to the largest homogeneous area which is the background. The histogram may have many peaks. Therefore, an iterative procedure is performed to find the most significant peaks. The number $\theta$ of sought after peaks is given as a parameter to the algorithm. This parameter corresponds to the number of sought after objects. The algorithm is also given an integer parameter $\xi$, which specifies the size of the neighborhood of a peak. The $\xi$-neighborhood of a coordinate (i,j) is defined as:

$$N_\xi(i,j) = \{(\alpha,\beta) | \max\{|\alpha - i|, |\beta - j|\} \leq \xi\}. \quad (21)$$

i.e. the coordinates in the square of size $\xi \times \xi$ around the coordinate (i,j). The coordinates outside the neighborhood $N_\xi$ are the candidates for the locations of new peaks. Thus, an iterative procedure is used in order to find all the peaks. The peaks are labeled $1,\ldots,\theta$. FIG. 4 provides an example of a frequency histogram with the first (highest) peak found.

The output of the algorithm is a set of vectors $\Psi = \{\rho_i\}_{i=1,\ldots,\theta}, \rho_i = (\rho_i^1, \ldots, \rho_i^\eta) \in \mathbb{N}^\eta$ that contains the found peaks. Details of this step are given in a flowchart in FIG. 5. The color histogram $f$, the number of sought after clusters $\theta$ and the size of each peak neighborhood $\xi$ are input to the algorithm in step 500. The resulting list of peaks $\Psi$ is initialized in step 502. A loop which constructs the result is run in steps 504-510. The exit condition of the loop is checked in step 504. The next global maxima c, which is a peak of $f$ is found in step 506. The coordinates of c are added to $\Psi$ in step 508. The values of $f$ in the $\xi$-neighborhood of c are zeroed in step 510. Finally, $\Psi$ is output in step 512.

5. Finding the Nearest Peak to Each Color

In this stage, each quantized color vector is associated with a single peak. The underlying assumption is that the quantized color vectors, which are associated with the same peak, belong to the same object in the color image cube I. Each quantized color is associated with the peak that is the closest to it according to the Euclidean distance. Each quantized color is labeled by the number of its associated peak. Let $$\gamma: \vec{c}_{ij} \to d \in \{1,\ldots,\theta\} \quad (22)$$

be this labeling function. It is then defined as:

$$\gamma(\vec{c}_{ij}) \triangleq \arg\min_{1 \leq k \leq \theta} \{\|\rho_k - \vec{c}_{ij}\|\}. \quad (23)$$

i.e. each quantized color is assigned the peak number which has the closest color to it according to the Euclidean distance.

6. Construction of the Output Image

The final step assigns a unique color $\kappa_i$, $1 \leq i \leq \theta$, to each coordinate in the image according to its label $\gamma(\vec{c}_{ij})$. This output image is denoted by $\Omega$. Those who are skilled in the art can use the K-means algorithm (Trevor Hastie, Robert Tibshirani and Jerome Friedman, "The Elements of Statistical Learning—Data mining, Inference and Prediction, Springer 2002, ISBN 0-387-95284-5, hereinafter (KMEANS), pages 412-414, 461-465) in order to perform the clustering operation described above.

Figure 6:
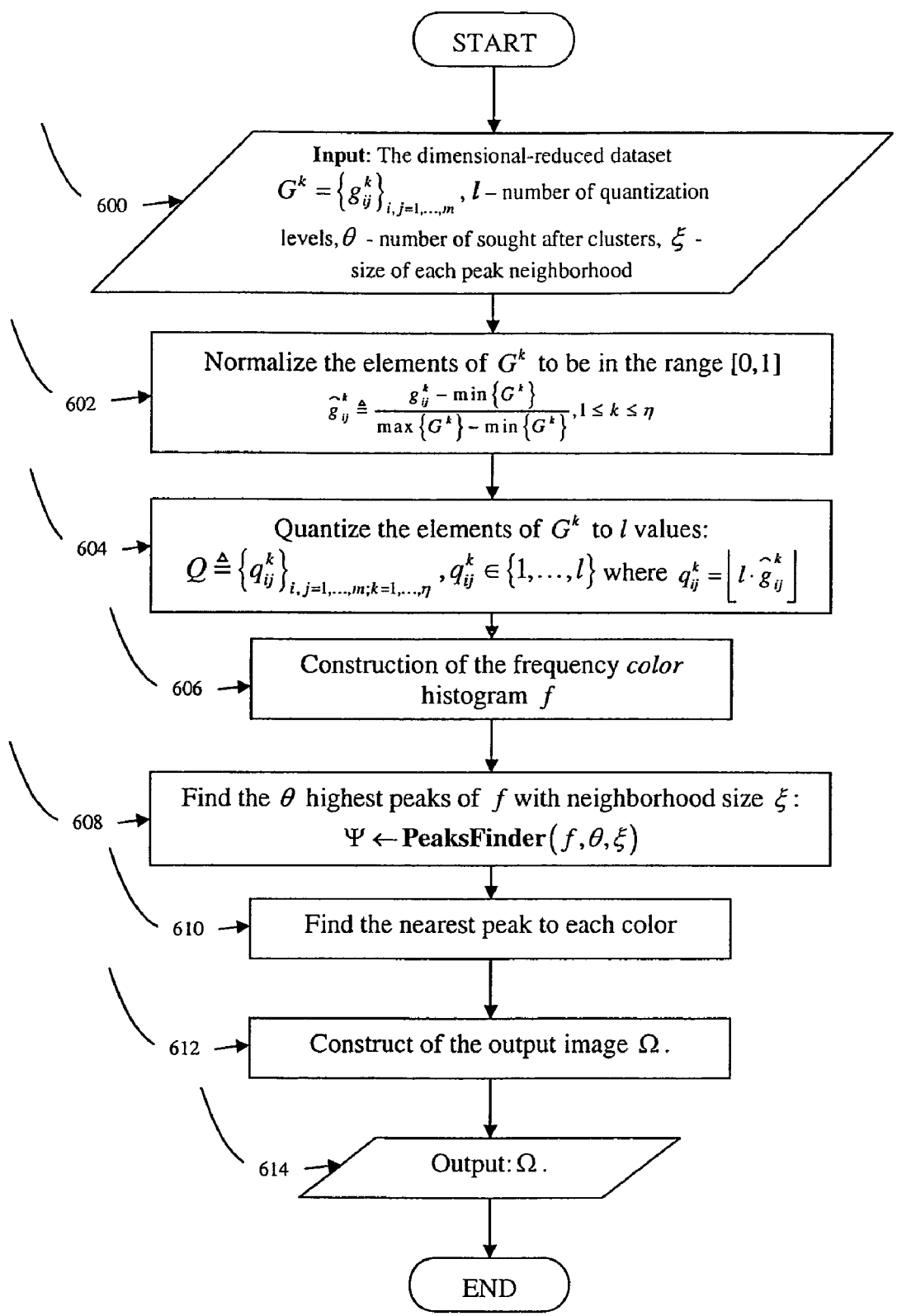
FIG. 6 shows a flow chart of the "clustering by colors" process.

The Clustering by colors algorithm is given as a flowchart in FIG. 6. The dimensionally-reduced dataset $G^k = \{g_{ij}^k\}_{i,j=1,\ldots,m}$, the number of quantization levels—l, the number of sought after clusters $\theta$ and the size of each peak neighborhood $\xi$ are input to the clustering by colors algorithm in step 600. The dimensional-reduced dataset is normalized in step 602 as described in Eq. 17. The normalized dataset is given by $\hat{G}^k$. Next, $\hat{G}^k$ is quantized in step 604 as described in Eqns. 18 and 19 and in the "uniform quantization of the normalized input image cube $\hat{G}^k$" step in the "segmentation by color" above.

Figure 5:
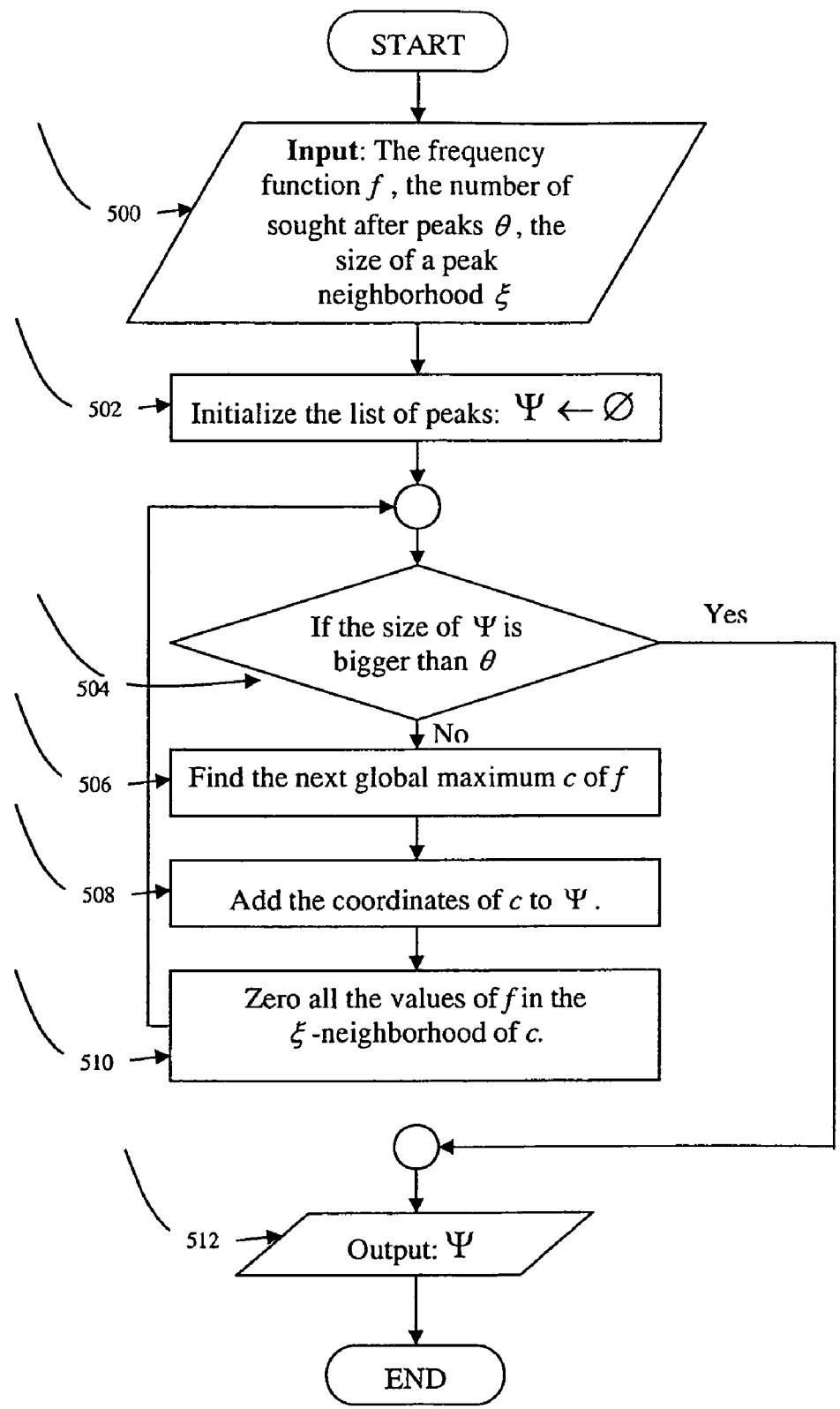
FIG. 5 shows a flow chart for a Peaks Finder process.

The color frequency histogram of $\hat{G}^k$ is calculated in step 606 as described in step 3 of the clustering by colors algorithm (see above). The peaks of the color histogram are found in step 608 as illustrated in FIG. 5. The nearest peak to each color is found in step 610 as described in step 5 of the clustering by colors algorithm (see above). The output image Ω is constructed in step 612 and output in step 614.

Sub-Pixel Segmentation (SPS)

The first steps of the sub-pixel segmentation procedure are similar to those used by the above-pixel segmentation: the dimensionality reduction is used as described above and $\Gamma_B$ is normalized according to Eq. 17.

Let $\hat{G}=\{\hat{G}^k\}_{k=1}^n$ be the normalized 3-D image volume in the reduced dimension as described in Eq. 17 and let $\hat{g}_{ij}$ be a hyper-pixel in $\hat{G}$. Sub-pixel segments have high contrast with the hyper-pixels in their local neighborhood. These points are referred to as isolated points. The following steps are applied to detect isolated points. The α-neighborhood of $\hat{g}_{ij}^k$ is defined as $$\alpha(\hat{g}_{ij}^k) \triangleq \{\hat{g}_{mn}^k\}_{m=i-\alpha,\ldots,i+\alpha,n=j-\alpha,\ldots,j+\alpha}.$$

The number of pixels in $\alpha(\hat{g}_{ij}^k)$ whose differences from $\hat{g}_{ij}^k$ are above a given threshold $\tau_1$ are computed next. This number is denoted by $$\Delta_\alpha(\hat{g}_{ij}^k) \triangleq |\{\hat{g}_{mn}^k : |\hat{g}_{ij}^k - \hat{g}_{mn}^k| > \tau_1, \hat{g}_{mn}^k \in \alpha(\hat{g}_{ij}^k)\}|.$$

If $\Delta_\alpha(\hat{g}_{ij}^k)$ is above a given threshold $\tau_2$ then $\hat{g}_{ij}^k$ is classified as an isolated point. $\tau_2$ determines the number of pixels that are different from $\hat{g}_{ij}^k$ in the neighborhood of $\hat{g}_{ij}^k$, in order for $\hat{g}_{ij}^k$ to be classified as an isolated point.

A coordinate (i,j) is classified as a sub-pixel segment if there are $k_1$ and $k_2$ such that $\hat{g}_{ij}^{k_1}$ and $\hat{g}_{ij}^{k_2}$ are isolated points. The requirement that a coordinate will contain an isolated point in two images prevents the misclassification of noisy isolated points as sub-pixel segments.

Clustering Using the DB Method

Clustering of a high-dimensional dataset Γ can be achieved as follows: the dimensionality of a dataset Γ is first reduced by applying the DB algorithm, then clustering is achieved by applying the K-means algorithm (KMEANS) on the points in the reduced dimension space.

Figure 7:
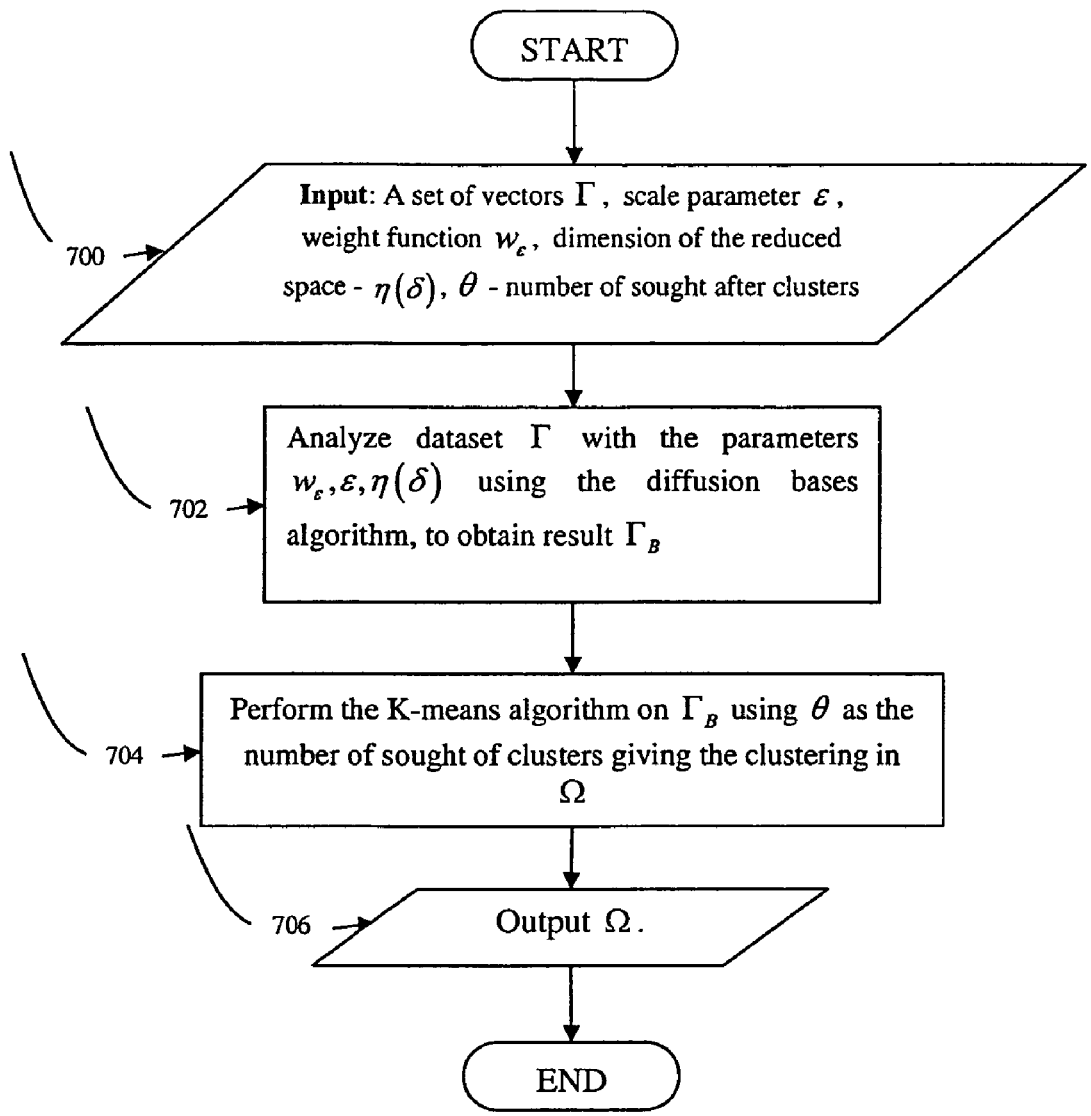
FIG. 7 (shows a flow chart of clustering of data using the DB algorithm of the present invention, as applied to a dataset of vectors $\Gamma$.
Figure 8A:
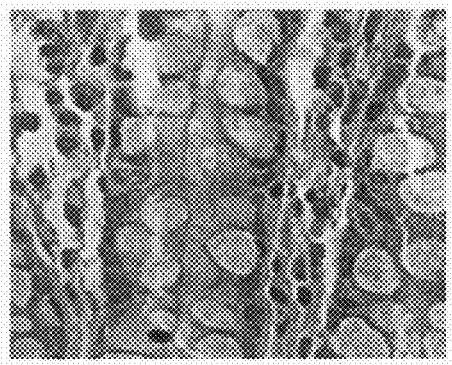
FIG. 8A shows the WAV image of a hyper-spectral microscopy image of a healthy human tissue.
Figure 8B:
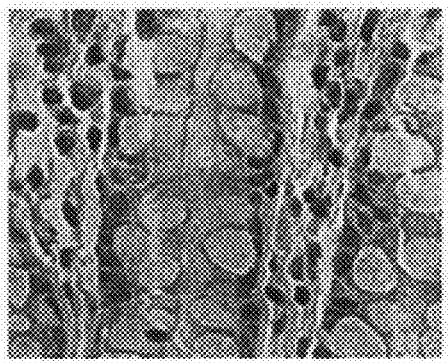
FIG. 8B shows the 50$^{th}$ wavelength.
Figure 8C:
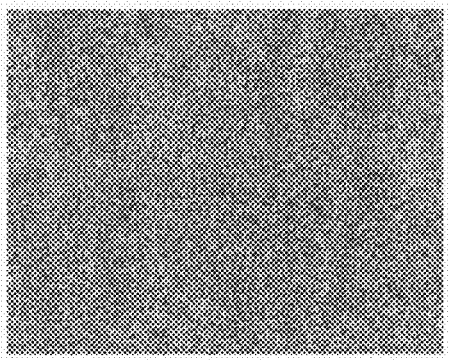
FIG. 8C shows the 95$^{th}$ wavelength.
Figure 8D:
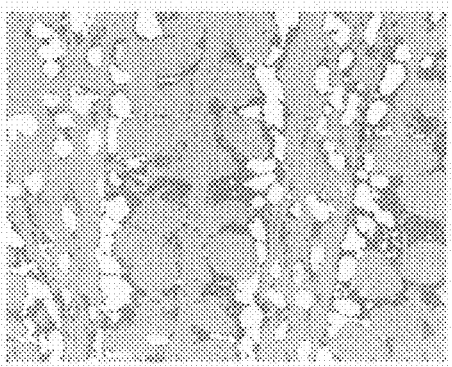
FIG. 8D shows the result of the application of the WWG algorithm.
Figure 8E:
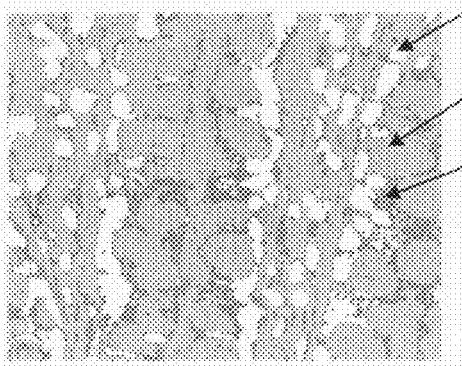
FIG. 8E shows the result of the application of the modified-WWG algorithms.
Figure 9A:
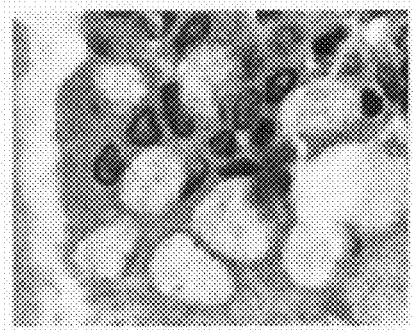
FIG. 9A shows the WAV image of a hyper-spectral microscopy image of a healthy human tissue.
Figure 9B:
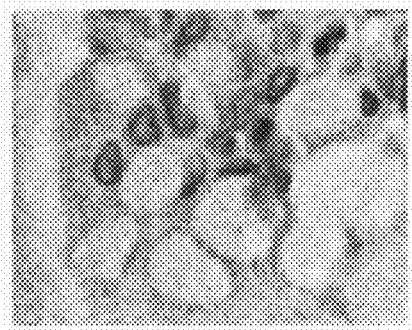
FIG. 9B shows the 40$^{th}$ wavelength.
Figure 9C:
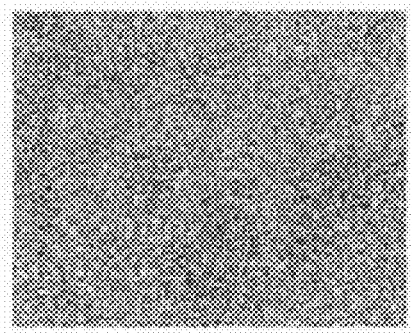
FIG. 9C shows the 107$^{th}$ wavelength.
Figure 9D:
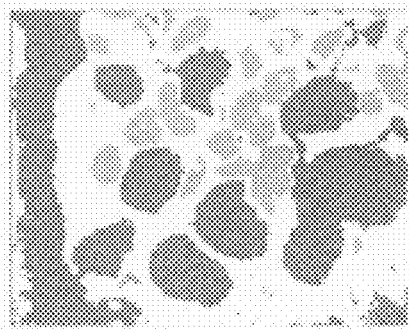
FIG. 9D shows the result of the application of the WWG algorithm.
Figure 9E:
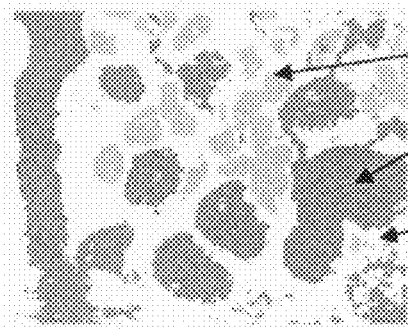
FIG. 9E shows the result of the application of the modified-WWG algorithms.
Figure 10A:
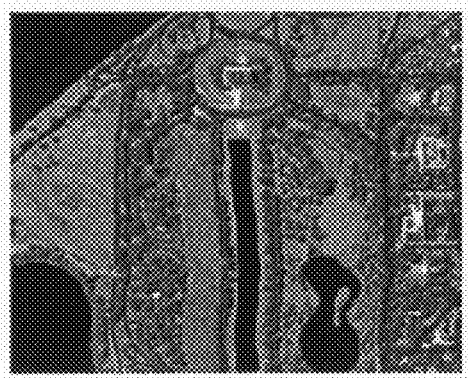
FIG. 10A shows the WAV image of a hyper-spectral satellite image of a shopping mall and its surroundings in Washington D.C.
Figure 10B:
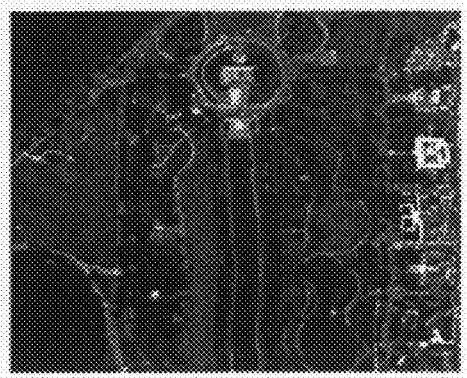
FIG. 10B shows the 10$^{th}$ wavelength.
Figure 10C:
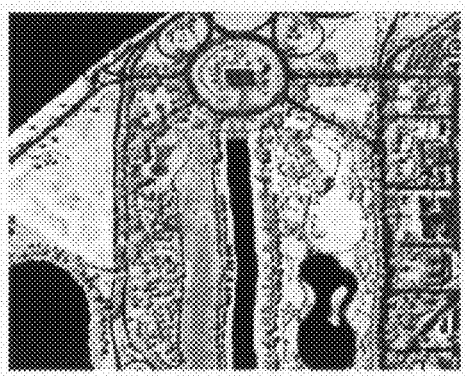
FIG. 10C shows the 80$^{th}$ wavelength.
Figure 10D:
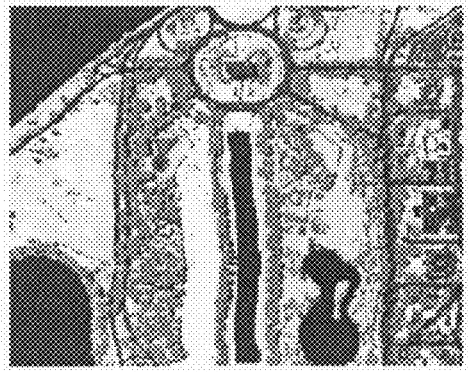
FIG. 10D shows the result of the application of the WWG algorithm.
Figure 10E:
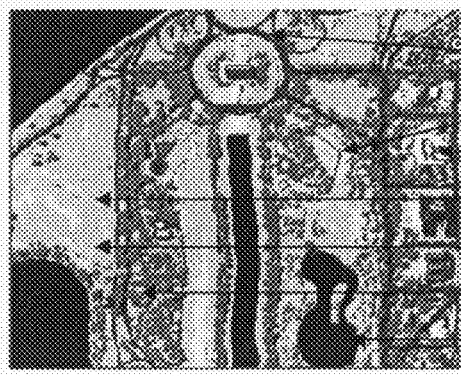
FIG. 10E shows the result of the application of the modified-WWG algorithms.
Figure 11A:
FIG. 11A shows the WAV image of a hyper-spectral satellite image of a mountain terrain which contains 24 sub-pixel segments.
Figure 11B:
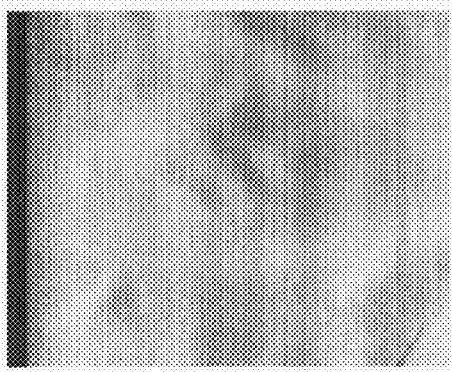
FIG. 11B shows the 35$^{th}$ wavelength.
Figure 11C:
FIG. 11C shows the 50$^{th}$ wavelength.
Figure 11D:
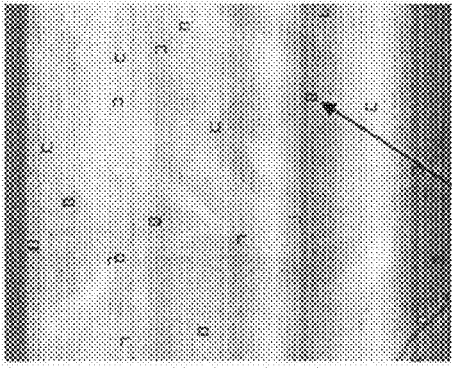
FIG. 11D shows the found sub-pixel segments marked by surrounding squares.

FIG. 7 shows a flowchart of the main steps of a clustering procedure using the DB algorithm of the present invention, as applied to a vector dataset Γ. Dataset Γ, a scale parameter ε, a weight function $w_\epsilon$, a dimension of reduced space—η(δ) and the number of sought after clusters θ are input to the algorithm in step 700. The dataset Γ is analyzed using the parameters ε, $w_\epsilon$, η(δ) by the DB algorithm in step 702 to produce a reduced dimensionality (projection on basis B) dataset $\Gamma_B$. Step 702 is similar to step 302 in the hyper-spectral segmentation by diffusion bases algorithm. Next, in step 704, the K-means algorithm is performed on $\Gamma_B$ using the parameters θ, resulting in a clustering Ω, which is output in step 706.

Since the DB algorithm reduces the dimensionality while preserving the geometry of the original dataset, the achieved clustering provides the clustering of the original dataset. The clustering in the dimension reduced space is achieved much faster than the clustering of the original data. Furthermore, clustering the original data is more prone to noise than the proposed algorithm and as such it might produce results which are less accurate.

Choosing ε

The choice of ε is required for the DMAPS and DB algorithms since it defines the size of the local neighborhood of each point. On one hand, a large ε produces a coarse analysis of the data as the neighborhood of each point will contain a large number of points. In this case, the diffusion distance will be close to one for most pairs of points. On the other hand, a small ε produces neighborhoods that contain only one point. In this case, the diffusion distance is zero for most pairs of points. Clearly, ε should lie between these two extreme cases and should be derived from the data. Let $E=\{e_{ij}\}_{i,j=1,\ldots,m}$ be the matrix of Euclidean distances between all pairs of points in Γ. Here are three optional methods:

The median heuristic: $\epsilon = \text{median}\{e_{ij}\}_{i,j=1,\ldots,m}$. The median of E provides an estimate to the average pairwise distance that is robust to outliers.

The max-min heuristic:

$$\varepsilon = \beta \cdot \max_i \min_j E \text{ where } \min_j E$$

is a column vector that contains the distance of each point to its closest neighbor. When β=1, each neighborhood contains at least one neighbor. Empirically, it was found that when $1 \leq \beta \leq 3$ satisfactory results are produced.

The nearest neighbor heuristic: In this case, a different value of ε is set for each point i. It is set to the Euclidean distance from i to its $l^{th}$ nearest neighbor. Let $\tilde{w}$ be the weight function using this method. Clearly, $\tilde{w}$ is not symmetric (a mandatory requirement as mentioned above). A symmetric w can be obtained from $\tilde{w}$ by either taking $$w = \frac{\tilde{w} + \tilde{w}^T}{2}$$

or $$w = \tilde{w} \cdot \tilde{w}^T.$$

Experimental Results

The results are divided into two parts:
  I. Segmentation of hyper-spectral imagery data.
  II. Clustering of non-imagery data.

Segmentation of Hyper-Spectral Imagery Data

The experimental results in this section are divided into three parts: (a) segmentation of hyper-spectral microscopy images that comes from medical imaging for laboratory examinations; (b) segmentation of remote-sensed hyper-spectral images; (c) sub-pixel segmentation of remote-sensed images. The results are provided using the two dimensionality reduction schemes described in FIGS. 1*a*, 1*b*, 2*a* and 2*b*.

The size of the hyper-spectral images is denoted by m×m×n where the size of every wavelength image is m×m and n is the number of wavelengths. The geometry (objects, background, etc.) of each hyper-spectral image is displayed using a gray image Y. This image is obtained by averaging the hyper-spectral image along the wavelengths. Formally, given a hyper-spectral image I of size m×m×n, Y is obtained by $$Y_{ij} = \frac{1}{n} \sum_{k=1}^{n} I_{ij}$$

$$1 \leq i, j \leq m$$

Y is referred to as the wavelength-averaged-version (WAV) of the image. All the results were obtained using specific instance of the max-min algorithm for choosing ε with β=2 as described above.

Segmentation of Hyper-Spectral Microscopy Images in Medical Analysis

FIGS. 8 and 9 show samples of healthy human tissues and results of the application of the WWG algorithm on these tissues. The images are of sizes 300×300×128 and 151×151× 128, respectively. The images contain three types of substances: nuclei, cytoplasm and background. The background belongs to the glass plate on which the tissue samples lie.

FIG. 8(*a*) shows the WAV image. FIGS. 8(*b*) and 8(*c*) show the 50$^{th}$ and 95$^{th}$ wavelengths, respectively. The nuclei and cytoplasm can hardly be noticed in FIG. 8(*c*) due to noise whose origin is the microscope that was used to obtain the image. This is just an example to the inherent noise in the hyper-spectral image—going through the entire image cube, the images in the 50$^{th}$ through the 70$^{th}$ wavelengths are less noisy than the rest. FIGS. 8(*d*) and 8(*e*) display the results of the application of the WWG and the modified-WWG algorithms, respectively. FIG. 8(*d*) was obtained using the parameters $\eta(\delta)=4$, $\phi=3$, $\xi=3$, $l=32$. FIG. 8(*e*) was obtained using the parameters $\eta(\delta)=4$, $\phi=3$, $\xi=0$, $l=16$. The algorithms clearly segment this image into three parts: a background 802, a cytoplasm 804 and nuclei 806.

FIG. 9(*a*) shows the WAV image. FIGS. 9(*b*) and 9(*c*) show the 40$^{th}$ and 107$^{th}$ wavelengths, respectively. The nuclei and cytoplasm can hardly be noticed in FIG. 9(*c*) due to noise whose origin is the microscope that was used to obtain the image. This is just an example to the inherent noise in the hyper-spectral image—going through the entire image cube, the images in the 40$^{th}$ through the 55$^{th}$ wavelengths are less noisy than the rest. FIGS. 9(*d*) and 9(*e*) display the results of the WWG algorithm and the modified-WWG algorithm, respectively. FIG. 9(*d*) was obtained using the parameters $\eta(\delta)=3$, $\phi=2$, $\xi=3$, $l=16$. FIG. 9(*e*) was obtained using the parameters $\eta(\delta)=3$, $\phi=2$, $\xi=1$, $l=8$. The image is clearly segmented into three parts: a background 902, a cytoplasm 904 and nuclei 906.

Segmentation of Remote Sensed Images

FIG. 10 shows a hyper-spectral satellite image of a shopping mall and its surroundings in Washington D.C. and the result after the application of the WWG algorithm on it. The image is of size 300×300×100. FIG. 10(*a*) shows the WAV of the image. The image contains water 1002, trees 1004, two types of grass 1006 and 1008 roofs 1010, trails 1012 and roads 1014. FIGS. 10(*b*) and 10(*c*) show the 10$^{th}$ and 80$^{th}$ wavelengths, respectively. FIGS. 10(*d*) and 10(*e*) are the results of the WWG algorithm and modified-WWG algorithm, respectively. FIG. 10(*d*) was obtained using the parameters $\eta(\delta)=4$, $\phi=8$, $\xi=7$, $l=32$. FIG. 10(*e*) was obtained using the parameters $\eta(\delta)=4$, $\phi=8$, $\xi=3$, $l=16$.

Sub-Pixel Segmentation

The results of the application of the sub-pixel segmentation algorithm on a 300×300×121 hyper-spectral image of a mountain terrain are given in FIG. 11. The image was taken from a high altitude airplane and it contains twenty four sub-pixel segments. FIG. 11(*a*) shows the WAV of the image. FIGS. 11(*b*) and 11(*c*) show the 35$^{th}$ and 50$^{th}$ wavelengths, respectively. The stripes in the image are due to noise which is caused by atmosphere conditions and calibration errors of the hyper-spectral camera. These problems can be found in most of the wavelengths. FIG. 11(*d*) displays $\hat{G}^2$ with squares around the sub-pixel segments that were found. The dimensionality was reduced using the algorithm in FIG. 2*b* with $\eta(\delta)=6$. The sub-pixel segmentation was obtained using $\tau_1=0.04$, $\tau_2=3$. The algorithm detects all twenty four segments that are sub-pixel. Every sub-pixel segment is marked by square as demonstrated, for example, by 1102.

The algorithm is highly robust to noise as it is demonstrated by the results at the presence of noisy wavelengths which are depicted in FIGS. 9(*b*)-11(*b*) and 9(*c*)-11(*c*). The algorithm is faster than current state-of-the-art methods and is able to preserve the geometry of the original dataset in the dimension reduced space. Although, methods like PCA and MDS are fast, they are sensitive to noise since they take into consideration all pair-wise distances. In this sense, these methods are global whereas our method is local i.e. it takes into consideration for each point only the distances to its closest neighbors. Thus, distances to noisy points—outliers—are not taken into account.

Clustering of Non-Imagery Data Using DB

In the following, we display clustering results obtained using the DB algorithm of the present invention. The clustering is performed on two DARPA Intrusion Detection research datasets:

1. 1998 DARPA Intrusion Detection Evaluation Data Sets:
   These data sets include nine weeks of network based attacks in the midst of normal background data
2. 1999 DARPA Intrusion Detection Evaluation Data Sets:
   These datasets include five weeks of network based attacks, where two weeks do not contain any attacks and one week contains selected attacks. The last two weeks contain 201 instances of about 56 types of attacks distributed throughout these two weeks The data collections normally begin at 8 AM each weekday and end at 6 AM on the following day, providing 22 hours of data each day. The data was collected continuously on a real network which simulated more than 1000 virtual hosts and 700 virtual users. The data was collected using the tcpdump program.

We analyzed one week of the 1999 DARPA Intrusion Detection Evaluation Data Sets. This week contains various types and instances of attacks. The major network attacks during this week were:

ipsweep—Surveillance sweep performing either a port sweep or ping on multiple host addresses.

mailbomb—A Denial of Service attack where we send the mailserver many large messages for delivery in order to slow it down, perhaps effectively halting normal operation.

neptune—Syn flood denial of service on one or more ports pod—Denial of service ping of death.

portsweep—Surveillance sweep through many ports to determine which services are supported on a single host.

satan—Network probing tool which looks for well-known weaknesses. Operates at three different levels. Level 0 is light.

Figure 12:
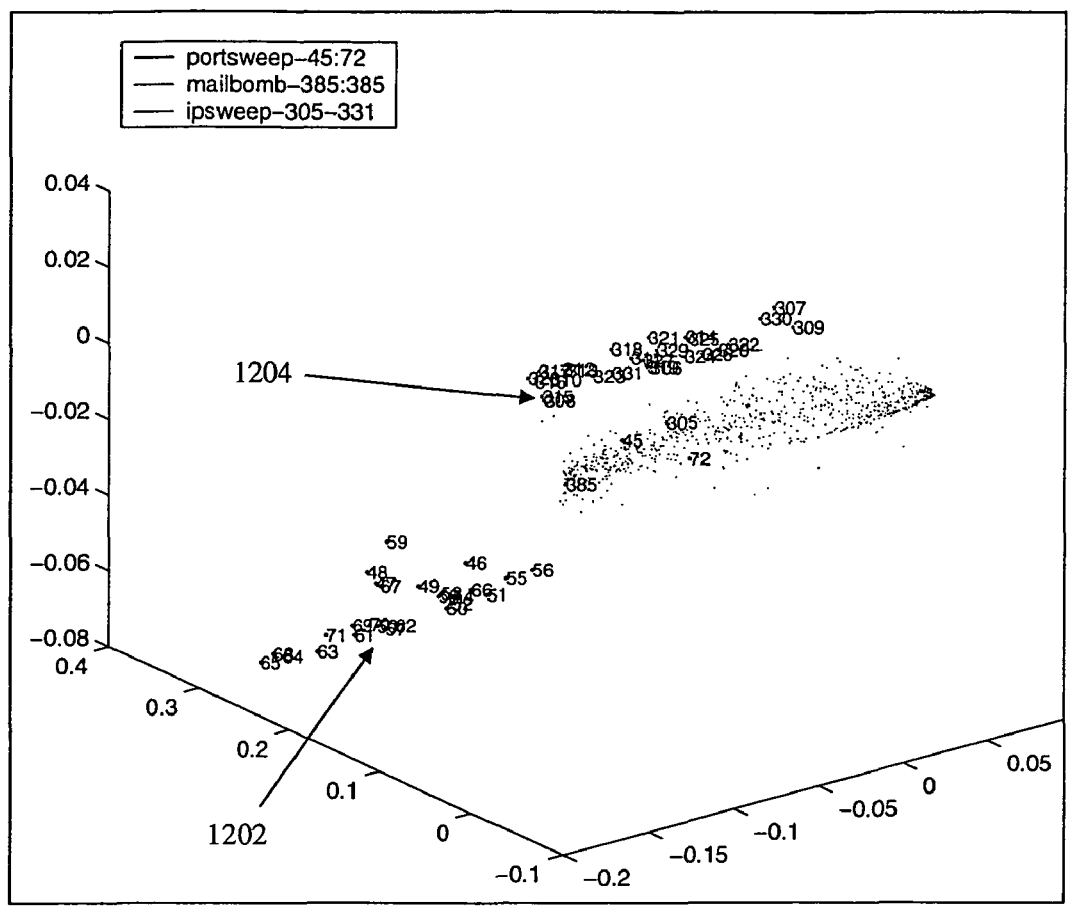
FIG. 12 shows the clustering results for network activity that took place on a Tuesday of a week that was analyzed from the DARPA Intrusion Detection Evaluation Data Sets.

We collected the following parameters from the raw tcpdump data every minute:

number of packets during this minute number of bytes during this minute number of icmp packets during this minute number of TCP packets during this minute number of TCP packets with different TCP flags (syn, ack, fin, rst) during this minute number of TCP connection during this minute number of completed and uncompleted TCP connections during this minute FIG. 12 displays the clustering results for Tuesday of the week analyzed. The portsweep attack is marked exemplarily by a cluster 1202. The attack took place between minute number 45 and minute number 72. The ipsweep attack is marked exemplarily by a cluster 1204. The attack occurred between minute number 305 and minute number 331.

Figure 13:
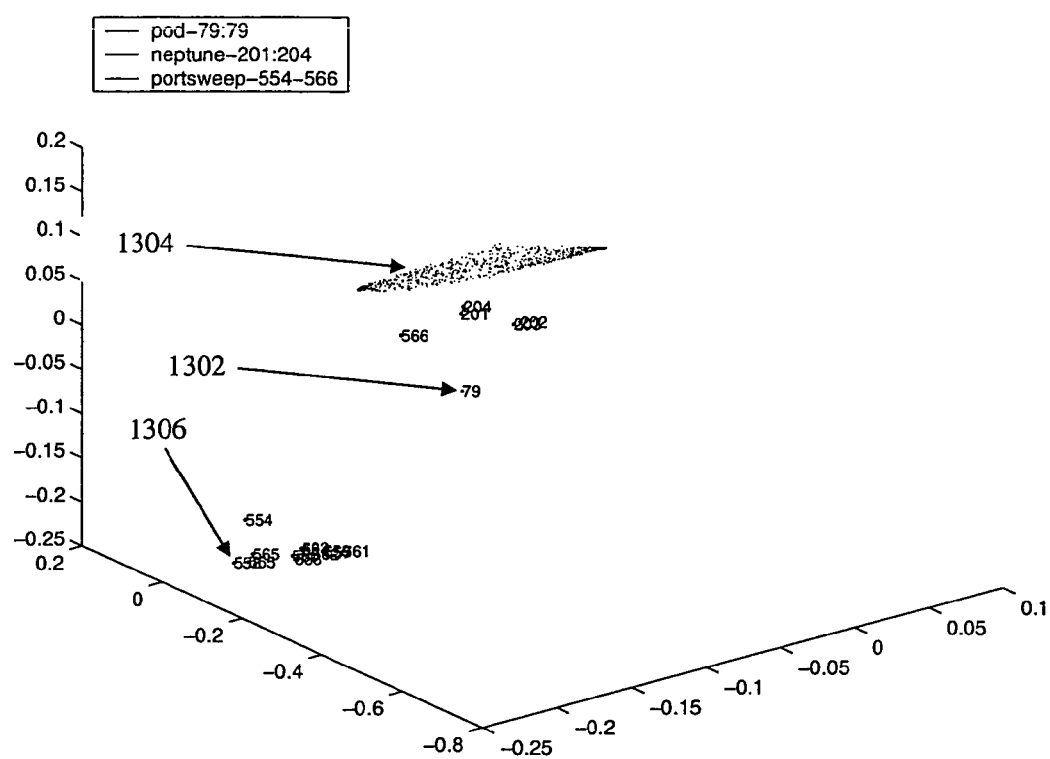
FIG. 13 shows the clustering results for network activity that took place on a Friday of a week that was analyzed from the DARPA Intrusion Detection Evaluation Data Sets.

FIG. 13 displays the clustering results for Friday of the week analyzed. The pod attack is marked by exemplarily a point 1302. The attack took place at minute number 79. The neptune attack is marked by exemplarily a cluster 1304. The attack occurred between minute number 201 and minute number 204. The portsweep attack is marked by exemplarily a cluster 1306. The attack took place between minute number 554 and minute number 566.

All publications and patents mentioned in this specification are herein incorporated in their entirety by reference into the specification, to the same extent as if each individual publication or patent was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention.

What is claimed is:

1. A method for dimensionality reduction of large data volumes comprising the steps of:
   a. providing a dataset $\Gamma$ of data points given as vectors;
   b. building a weighted graph G on $\Gamma$ with a weight function $w_\epsilon$, wherein $w_\epsilon$ corresponds to a local coordinate-wise similarity between the coordinates in $\Gamma$;
   c. constructing a random walk on graph G via a Markov transition matrix P, which is derived from $w_\epsilon$;
   d. performing a spectral decomposition of P to obtain right and left eigenvectors of P;
   e. projecting the data points in $\Gamma$ onto the right eigenvectors of P to obtain a set of projection values $\Gamma_B$ for each data point, whereby $\Gamma_B$ represents coordinates in a reduced space; and
   f. using the set of projection values to perform an action selected from the group consisting of clustering of an image, segmentation of an image, clustering of communication network activity, detection of an intrusion in communication network activity and detection of a buildup leading to a computer crash.

2. The method of claim 1, wherein dataset $\Gamma$ is a static dataset.

3. The method of claim 2, wherein the static dataset is uniform.

4. The method of claim 3, wherein the uniform static dataset represents hyper-spectral data.

5. The method of claim 1, wherein dataset $\Gamma$ is a heterogeneous dataset.

6. The method of claim 5, wherein the heterogeneous dataset is dynamic.

7. The method of claim 1, wherein $\Gamma=\{x_i\}_{i=1}^m, x_i \in R^n$ and wherein the step of building a weighted graph G on $\Gamma$ includes:
   i. providing a coordinate dataset $\Gamma'=\{x_j'\}_{j=1}^n$ based on $\Gamma$, and
   ii. building a weight function $w_\epsilon$ using coordinate dataset $\Gamma'=\{x_j'\}_{j=1}^n$.

8. The method of claim 1, wherein the step of projecting the data points in $\Gamma$ onto the eigenvectors of P to obtain a set of projection values $\Gamma_B$ for each data point includes:
   i. constructing a diffusion basis B using a spectral decay property of the spectral decomposition, and
   ii. projecting dataset $\Gamma$ onto basis B to obtain $\Gamma_B$.

9. The method of claim 7, wherein the providing a coordinate dataset $\Gamma'=\{x_j'\}_{j=1}^n$ based on $\Gamma$ further includes:
   A. constructing a matrix M so that its i-th row is composed of $x_i$,
   B. defining a vector $x_j'=(x_1(j), \ldots, x_m(j))$ to be the $j^{th}$ coordinate of all the vectors in $\Gamma$ wherein $x_j'$ is the j-th row of the transpose of matrix M, and
   C. using vectors x to construct coordinate dataset $\Gamma'=\{x_j'\}_{j=1}^n$.

10. A method for dimensionality reduction of large data volumes comprising steps of:
    a. providing a dataset $\Gamma$ of data points given as vectors;
    b. building a weighted graph G on $\Gamma$ with a weight function $w_\epsilon$, wherein $w_\epsilon$ corresponds to a local coordinate-wise similarity between the coordinates in $\Gamma$;
    c. constructing a matrix A which is the result of dividing each element of $w_\epsilon$ by a square sum of its row multiplied by a square sum of its column;
    d. performing a spectral decomposition of matrix A to obtain eigenvectors of A;
    e. projecting the data points in $\Gamma$ onto the eigenvectors of A to obtain a set of projection values $\Gamma_B$ for each data point, whereby $\Gamma_B$ represents coordinates in a reduced space; and
    f. using the set of projection values to perform an action selected from the group consisting of clustering of an image, segmentation of an image, clustering of communication network activity, detection of an intrusion in communication network activity and detection of a buildup leading to a computer crash.

11. The method of claim 10, wherein dataset $\Gamma$ is a static dataset.

12. The method of claim 11, wherein the static dataset is uniform.

13. The method of claim 12, wherein the uniform static dataset represents hyper-spectral data.

14. The method of claim 10, wherein dataset $\Gamma$ is a heterogeneous dataset.

15. The method of claim 14, wherein the heterogeneous dataset is dynamic.

16. The method of claim 10, wherein $\Gamma=\{x_i\}_{i=1}^m, x_i \in R^n$ and wherein the step of building a weighted graph G on $\Gamma$ includes:
    i. providing a coordinate dataset $\Gamma'=\{x_j'\}_{j=1}^n$ based on $\Gamma$, and
    ii. building a weight function $w_\epsilon$ using coordinate dataset $\Gamma'=\{x_j'\}_{j=1}^n$.

17. The method of claim 10, wherein the step of projecting the data points in $\Gamma$ onto the eigenvectors of A to obtain a set of projection values $\Gamma_B$ for each data point includes:
    i. constructing a diffusion basis B using a spectral decay property of the spectral decomposition, and
    ii. projecting dataset $\Gamma$ onto basis B to obtain $\Gamma_B$.

18. The method of claim 16, wherein the providing a coordinate dataset $\Gamma'=\{x_j'\}_{j=1}^n$ based on $\Gamma$ further includes:
    A. constructing a matrix M so that its i-th row is composed of $x_i$,
    B. defining a vector $x_j'=(x_1(j), \ldots, x_m(j))$ to be the $j^{th}$ coordinate of all the vectors in $\Gamma$, wherein $x_j'$ is the j-th row of the transpose of matrix M, and
    C. using vectors $x_j'$ to construct coordinate dataset $\Gamma'=\{x_j'\}_{j=1}^n$.

* * * * *